United States Patent
Mitamura

(10) Patent No.: US 11,709,384 B2
(45) Date of Patent: Jul. 25, 2023

(54) MULTILAYER FILM, OPTICAL DEVICE, PHOTONIC INTEGRATED CIRCUIT DEVICE, AND OPTICAL TRANSCEIVER

(71) Applicant: Fujitsu Optical Components Limited, Kawasaki (JP)

(72) Inventor: Nobuaki Mitamura, Saitama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 103 days.

(21) Appl. No.: 17/332,292

(22) Filed: May 27, 2021

(65) Prior Publication Data

US 2022/0004032 A1 Jan. 6, 2022

(30) Foreign Application Priority Data

Jul. 3, 2020 (JP) .................. 2020-115895

(51) Int. Cl.
| | |
|---|---|
| G02F 1/065 | (2006.01) |
| G02F 1/1337 | (2006.01) |
| G02B 6/122 | (2006.01) |
| G02F 1/035 | (2006.01) |
| G02B 6/12 | (2006.01) |

(52) U.S. Cl.
CPC ............ G02F 1/065 (2013.01); G02B 6/122 (2013.01); G02F 1/035 (2013.01); G02F 1/133711 (2013.01); *G02B 2006/12085* (2013.01); *G02B 2006/12142* (2013.01); *G02F 2202/022* (2013.01)

(58) Field of Classification Search
CPC ......... G02F 1/065; G02F 1/035; G02B 6/122; G02B 2006/12085; G02B 2006/12142
USPC ................................. 385/2, 4, 8, 14
See application file for complete search history.

(56) References Cited

U.S. PATENT DOCUMENTS

| | | | |
|---|---|---|---|
| 5,834,803 | A | 11/1998 | Nashimoto |
| 5,991,067 | A | 11/1999 | Minakata et al. |
| 7,643,714 | B2 | 1/2010 | Hochberg et al. |
| 2011/0170820 | A1 | 7/2011 | Prather et al. |

FOREIGN PATENT DOCUMENTS

JP 10-82921 3/1998

OTHER PUBLICATIONS

Rezzonico, D. et al., "Photostabililty studies of pi-conjugated chromophores with resonant and nonresonant light excitation for long-life polymeric telecommunication devices," J. Opt.Soc. Am. B., vol. 24, No. 9, pp. 2199-2207, 2007.

*Primary Examiner* — Ruiyun Zhang
(74) *Attorney, Agent, or Firm* — Staas & Halsey LLP

(57) ABSTRACT

A multilayer film includes a single-crystal silicon layer, a first layer containing Zr, a second layer containing $ZrO_2$, and a third layer containing a perovskite oxide having an electrooptic effect. The first layer, the second layer, and the third layer are provided in this order above the single-crystal silicon layer, and the multilayer film is transparent to a wavelength to be used.

10 Claims, 22 Drawing Sheets

| | CRYSTAL STRUCTURE | REFRACTIVE INDEX | LATTICE CONSTANT | DIAGONAL |
|---|---|---|---|---|
| PZT | TETRAGONAL | 2.44 | 0.401 | 0.567 |
| $ZrO_2$ | CUBIC | 1.54 | 0.514 | |
| Si | CUBIC | | 0.543 | |

[nm]

| | CRYSTAL STRUCTURE | REFRACTIVE INDEX | LATTICE CONSTANT | DIAGONAL |
|---|---|---|---|---|
| PLZT | TETRAGONAL | 2.40 | 0.408 | 0.577 |
| $ZrO_2$ | CUBIC | 1.54 | 0.514 | |
| Si | CUBIC | | 0.543 | |

[nm]

| | CRYSTAL STRUCTURE | REFRACTIVE INDEX | LATTICE CONSTANT | DIAGONAL |
|---|---|---|---|---|
| PZT | TETRAGONAL | 2.44 | 0.401 | |
| STO | CUBIC | 2.28 | 0.391 | 0.553 |
| $ZrO_2$ | CUBIC | 1.54 | 0.514 | |
| Si | CUBIC | | 0.543 | |

[nm]

| | CRYSTAL STRUCTURE | REFRACTIVE INDEX | LATTICE CONSTANT | |
|---|---|---|---|---|
| | | | | DIAGONAL |
| PLZT | TETRAGONAL | 2.40 | 0.408 | |
| STO | CUBIC | 2.28 | 0.391 | 0.553 |
| $ZrO_2$ | CUBIC | 1.54 | 0.514 | |
| Si | CUBIC | | 0.543 | |

[nm]

| | CRYSTAL STRUCTURE | REFRACTIVE INDEX | LATTICE CONSTANT | DIAGONAL |
|---|---|---|---|---|
| PZT | TETRAGONAL | 2.44 | 0.401 | |
| MgO | CUBIC | 1.71 | 0.421 | 0.595 |
| $ZrO_2$ | CUBIC | 1.54 | 0.514 | |
| Si | CUBIC | | 0.543 | |

[nm]

| | CRYSTAL STRUCTURE | REFRACTIVE INDEX | LATTICE CONSTANT | |
|---|---|---|---|---|
| | | | | DIAGONAL |
| PLZT | TETRAGONAL | 2.40 | 0.408 | |
| MgO | CUBIC | 1.71 | 0.421 | 0.595 |
| $ZrO_2$ | CUBIC | 1.54 | 0.514 | |
| Si | CUBIC | | 0.543 | |

[nm]

MULTILAYER FILM, OPTICAL DEVICE, PHOTONIC INTEGRATED CIRCUIT DEVICE, AND OPTICAL TRANSCEIVER

CROSS-REFERENCE TO RELATED APPLICATIONS

This application is based upon and claims priority to earlier Japanese Patent Application No. 2020-115895 filed Jul. 3, 2020, which is incorporated herein by reference in its entirety.

FIELD

The present disclosure relates to a multilayer film, an optical device, a photonic integrated circuit device, and an optical transceiver

BACKGROUND

Due to the rapid increase in Internet Protocol (IP) data traffic, expansion of fiber optic network capacities is demanded. In addition, in order to spatially increase the efficiency of accommodating fiber optic transmission equipment, further downsizing and integration of optical transmitters and receivers are desired. Because silicon (Si) waveguides have strong optical confinement, and because the bending radius can be reduced to about 10 μm, Si photonic integrated circuit devices have been applied to optical transmitters and receivers.

A Si modulator formed by Si waveguides is configured to modulate light making use of a change in the refractive index of Si according to a change in carrier concentration, and this phenomenon is called the carrier plasma effect or the electrorefractive effect. However, since the change in the refractive index of a Si modulator is smaller than the refractive index change in a lithium niobate ($LiNbO_3$ abbreviated as LN) modulator based upon the electrooptic effect, the modulation efficiency of a Si modulator may be insufficient. For this reason, LN modulators are currently the mainstream.

For a material of an optical modulator that can be integrated in Si photonic circuits, an organic material, i.e., a polymer material having the electrooptic effect higher than $LiNbO_3$, is promising. As illustrated in FIG. 1, an optical modulator using a slot waveguide 221 has been proposed. See, for example, Patent Document 1 presented below. A gap 223 between two neighboring stripes 220 of the slot waveguide is filled with an electrooptic polymer 222.

Although electrooptic polymers are applicable to Si photonic integrated circuits, they have not yet been put into practical use because of concern about long-term reliability. In fact, it has been reported that photooxidation occurs when a strong light beam in the 1550 nm band, which is one of the fiber optic communications bands, is transmitted through the electrooptic polymer waveguide in the oxygen-containing atmosphere. See, for example, Non-patent Document 1 presented below. Photooxidation causes deterioration of polymer materials, and consequently causes deterioration of modulation characteristics and optical properties.

RELATED PUBLICATIONS

Patent Document 1: U.S. Pat. No. 7,643,714 Non-patent Document 1: D. Rezzonico, et al., "Photostability studies of pi-conjugated chromophores with resonant and nonresonant light excitation for long-life polymeric telecommunication devices," J. Opt. Soc. Am. B., vol. 24, no. 9, pp. 2199-2207, 2007

SUMMARY

According to one aspect of the disclosure, a multilayer film includes a single-crystal silicon layer, a first layer containing Zr, a second layer containing $ZrO_2$, and a third layer containing a perovskite oxide having an electrooptic effect, the first layer, the second layer, and the third layer being provided in this order above the single-crystal silicon layer. The multilayer film is transparent to a wavelength to be used.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

In the embodiments, a multilayer film, which can be integrated in a photonic integrated circuit and has long-term reliability, is provided. An optical device using the multilayer film is also provided.

In particular, long-term reliability of a photonic waveguide and an optical device using the photonic waveguide is achieved by configuring the photonic waveguide with a multilayer film that includes an inorganic material, particularly, a perovskite oxide having an electrooptic effect greater than $LiNbO_3$. A slot waveguide formed of the multilayer film of the embodiment is applied to an optical device such as an optical modulator, an optical switch, an optical resonator or the like, and can be integrated in a Si photonic circuit.

Figure 1:
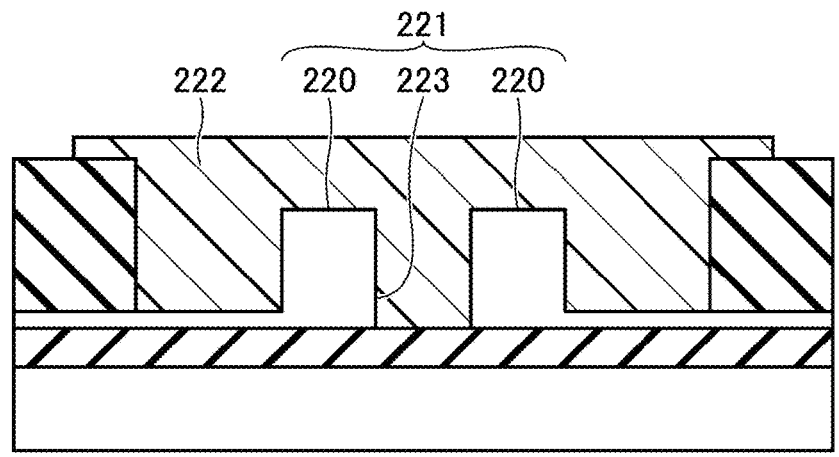
FIG. 1 is a schematic diagram of a conventional slot waveguide using an electrooptic polymer.
Figure 2:
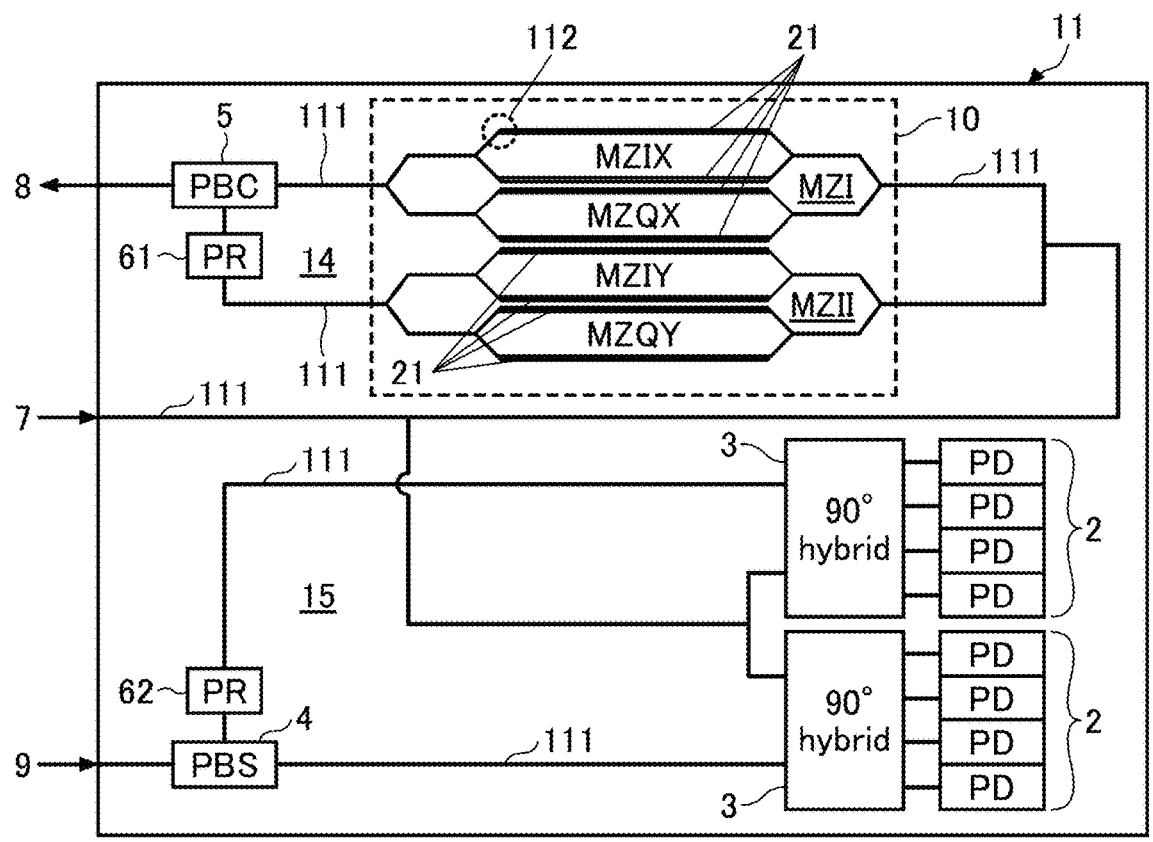
FIG. 2 is a schematic diagram of a photonic integrated circuit device to which an optical device of an embodiment is applied.

FIG. 2 is a schematic diagram of a photonic integrated circuit device 11, to which an optical device of an embodiment is applied. The photonic integrated circuit device 11 may be used as a frontend circuit for fiber optic transmission and reception. The photonic integrated circuit device 11 includes an optical transmitter circuit 14 and an optical receiver circuit 15. The optical transmitter circuit 14 has an electric-to-optical (E/O) conversion function. The optical receiver circuit 15 has an optical-to-electrical (O/E) conversion function. In this example, the optical device is an optical modulator 10 used in the optical transmitter circuit 14.

The interaction regions of the optical modulator 10 are formed by slot waveguides 21. In the interaction region, an electric signal and light interact with each other, and the speed or the phase of light travelling through the waveguide changes depending on, for example, a voltage or an electric field applied to the waveguide.

The photonic integrated circuit device 11 is formed on a Si substrate using silicon photonics technology, and the optical components integrated on the Si substrate are connected by Si waveguides 111. The slot waveguides 21 used in the interaction region of the optical modulator 10 are connected to the Si waveguides 111 by mode converters 112. Each of the mode converters 112 converts the propagation mode between the light travelling through the slot waveguide 21 and the light travelling through the Si waveguide.

Although, in FIG. 2, the mode converter 112 is explicitly denoted at one site between the slot waveguide 21 and the Si waveguide for convenience of illustration, the mode converter 112 is actually provided at every site connecting between the slot waveguide 21 and the Si waveguide 111.

The optical modulator 10 has, for example, four child Mach-Zehnder (MZ) interferometers MZIX, MZQX, MZIY, and MZQY. Two master blocks or parent MZ interferometers MZI and MZII are formed by nesting the child MZ interferometers. In this optical modulator 10, eight slot waveguides 21 are provided. The light beam input from the input port 7 enters the optical modulator 10 through the Si waveguide 111. The polarization plane of the light component having been modulated at one of the two master blocks, for example, by the parent MZ interferometer MZII, is rotated by 90 degrees at a polarization rotator (PR) 61. The light component having been modulated by the other parent MZ interferometer, for example, MZI, is combined with the polarization-rotated light component at the polarization beam combiner (PBC) 5. The combined light is then output from the output port 8.

In the optical receiver circuit 15, photodetectors (PDs) 2, 90-degree hybrid optical mixers 3, a polarization beam splitter (PBS) 4, and a polarization rotator (PR) 62 are integrated. A received signal light, which is input through the optical receiver port 9, is split by the PBS 4 into two polarized light components. The polarization plane of one of the polarized light components is rotated by 90 degrees at the PR 62, and the two light components with the same polarization are incident on the associated 90-degree hybrid optical mixers 3.

Meanwhile, a portion of local light input from the optical input port 7 is branched into two, and guided to each of the 90-degree hybrid optical mixers 3. At the 90-degree hybrid optical mixer 3, the local light is used as the reference light to detect the received signal light. The 90-degree hybrid optical mixer 3 is configured to convert the optical phases contained in the received signal light into light intensities, and the light intensities are detected by the PDs 2. Specifically, for each of the polarized light waves, differential outputs of an I component and a Q component with 90-degree phase difference are acquired.

Figure 3:
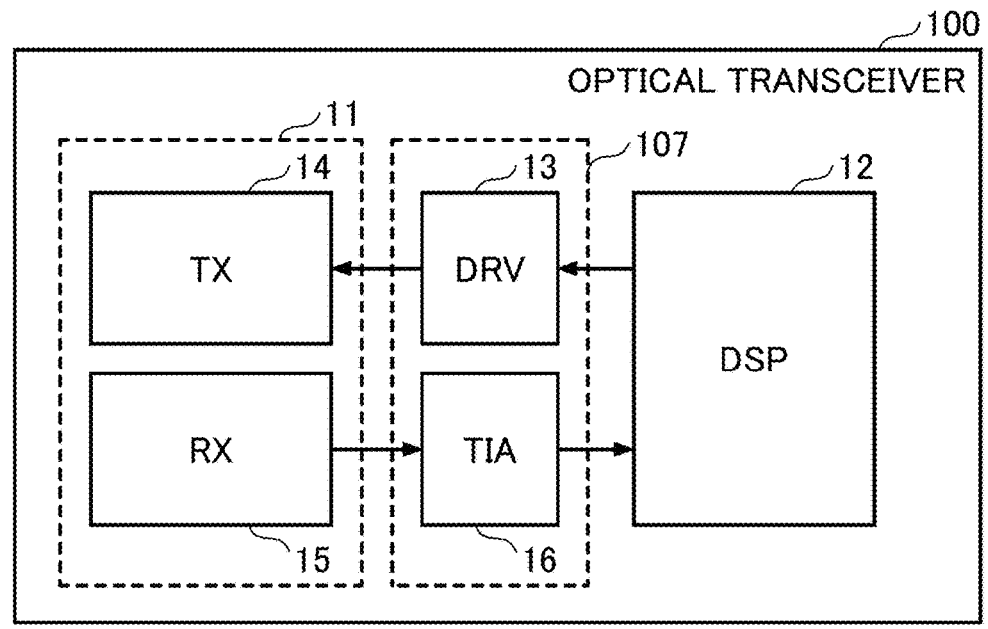
FIG. 3 is a schematic block diagram of an optical transceiver using the photonic integrated circuit device of FIG. 2.

FIG. 3 is a schematic block diagram of an optical transceiver 100 using the photonic integrated circuit device 11 of FIG. 2. The optical transceiver 100 has an electric circuit device 107 and a digital signal processor (DSP) 12, as well as the photonic integrated circuit device 11 which serves as an optical transmitter/receiver frontend circuit. The DSP 12 generates IQ modulation formats for the data signal to be transmitted, and demodulates the received signal. The electric modulation signal generated by the DSP 12 is amplified by the driver circuit (DRV) 13 of the electric circuit device 107, and input as a high-speed analog drive signal to the optical modulator 10 of the optical transmitter circuit 14.

A photocurrent generated at each of the PDs 2 (see FIG. 2) is output from the optical receiver circuit 15, amplified by the transimpedance amplifier (TIA) 16 of the electric circuit device 107, and input as an electric voltage signal to the DSP 12 for demodulation.

Exemplified structures of the slot waveguide 21 configuring an optical device such as the optical modulator 10 will be described below, as well as the structures of the multilayer film used in the slot waveguide 21.

First Embodiment

Figure 4:
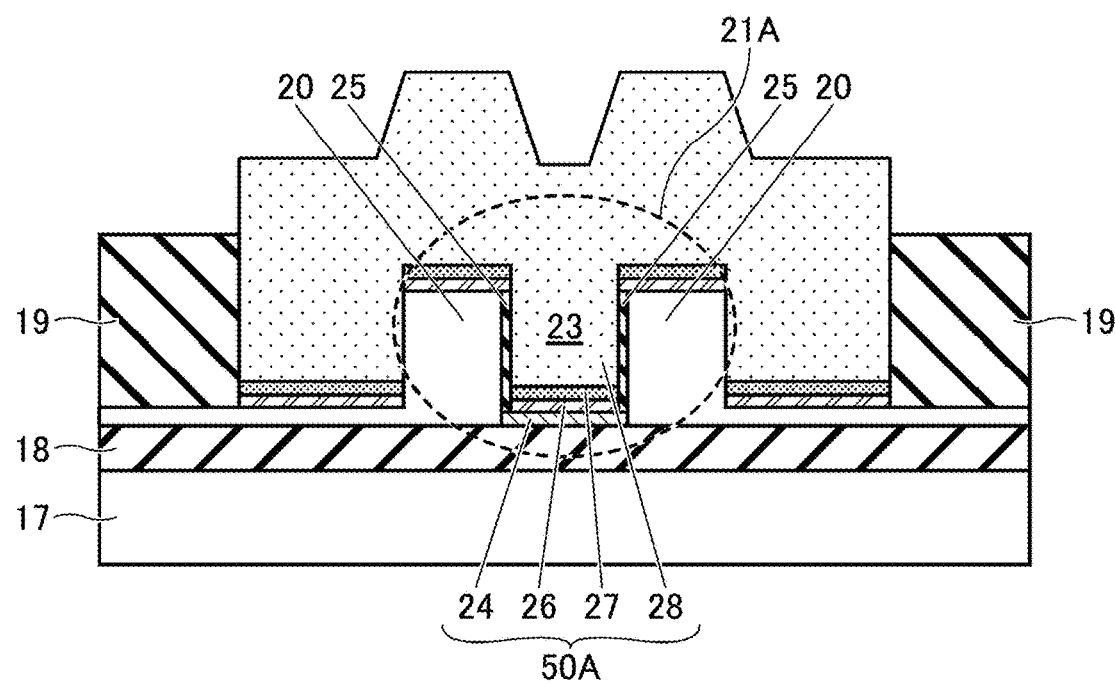
FIG. 4 is a schematic diagram of a slot waveguide having a multilayer film of the first embodiment.

FIG. 4 is a cross-sectional view of a slot waveguide 21A using a multilayer film 50A according to the first embodiment. The slot waveguide 21A is, for example, one of the eight slot waveguides 21 illustrated in FIG. 2. An $SiO_2$ layer 18 is formed on a Si substrate 17, and a pair of conductors 20 are provided on the $SiO_2$ layer 18. In this specification and the appended claims, the term "on", "above", "over", "under", or "below" does not indicate the absolute direction, and is intended to explain the positional relationship viewed in the film-growing direction or the stacking direction. The pair of conductors 20 serve as electrodes for applying an electric field to the slot waveguide, and for this reason, the conductors 20 are hereinafter referred to as "electrodes 20". The electrodes 20 may be formed of single-crystal Si, to which impurity elements such as boron (B) and phosphorus (P) are added to reduce the resistance.

A narrow gap or slot 23 is formed between the two electrodes 20. A high-resistance, electrically insulative single-crystal Si layer 24 is provided at the bottom surface of the slot 23. The single-crystal Si layer 24 is an undoped layer grown without intentionally adding an impurity element. When a silicon-on-insulator (SOI) substrate is used, the uppermost Si layer of the SOI substrate can be etched into the electrodes shape with a slot between them, and impurities may be injected by masking an unnecessary area, thereby forming the electrodes 20 and the single-crystal Si layer 24.

Because the single-crystal. Si layer 24 provided between the pair of electrodes 20 is electrically insulative, a predetermined voltage can be applied to the electrodes 20 without causing electrical short circuit. The thickness of the single-crystal Si layer 24 is, for example, one third (⅓) or less, more preferably, one fifth (⅕) or less of the height of the electrodes 20 in order to enhance the voltage-applying efficiency, namely, to reduce the applied voltage as much as possible.

The inner side walls of the two electrodes 20 facing each other are covered with an insulating layer 25 having a thickness of about 2 to 5 nm. The insulating layer 25 is formed of $SiO_2$, SiN, SiON, or other suitable insulators. The insulating layer 25 also prevents an electrical short circuit between the two electrodes 20 more reliably.

The slot 23 between the two electrodes 20 is filled with a multilayer film 50A of the embodiment. The multilayer film 50A includes the insulative single-crystal Si layer 24, a first layer 26, a second layer 21, and a third layer 28. The first layer 26, the second layer 21, and the third layer 28 may be epitaxially grown on the single-crystal Si layer 24.

The first layer 26 contains Zr, and is as thin as about 5 to 8 nm thickness. The second layer 27 contains $ZrO_2$, which is epitaxially grown on the first layer 26. The third layer 28 contains a perovskite oxide, which is epitaxially grown on the second layer 27. In the first embodiment, the third layer 28 is formed of $Pb(Zr, Ti)O_3$ (hereinafter, abbreviated as "PZT").

The slot waveguide 21A is configured by the multilayer film 50A which fills the slot 23 between the two electrodes 20. The area other than the multilayer film 50A configuring the slot waveguide 21A may be covered with an insulating layer 19.

Figure 5:
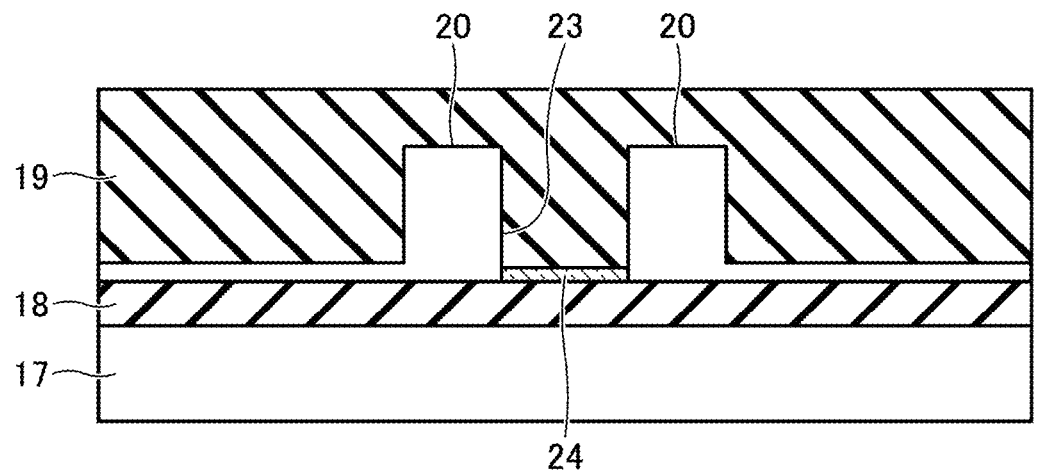
FIG. 5 illustrates a fabrication process of the slot waveguide of the first embodiment.
Figure 6:
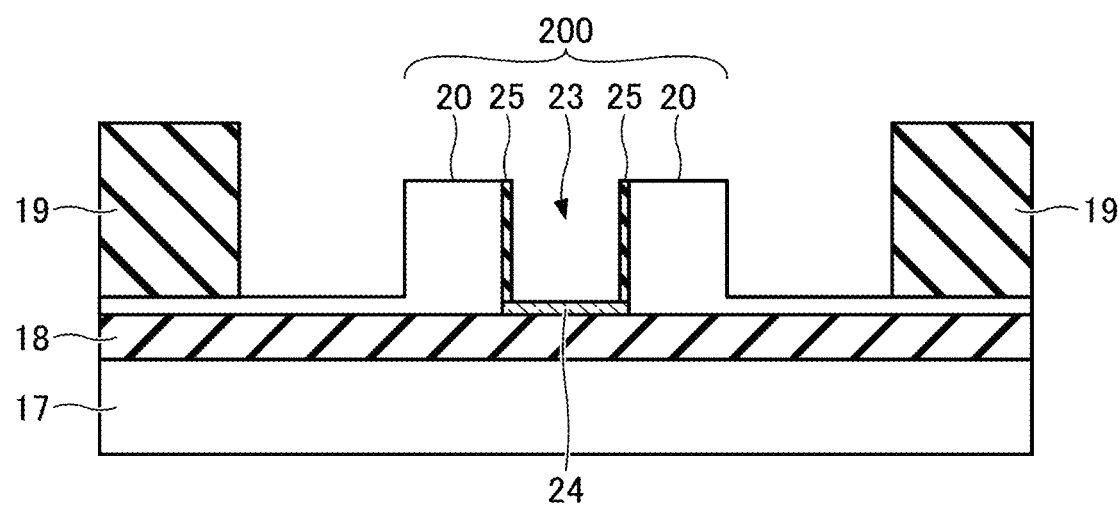
FIG. 6 illustrates a fabrication process of the slot waveguide of the first embodiment.

FIG. 5 and FIG. 6 illustrate fabrication of a slot electrode 200, formed prior to the multilayer film 50A. In FIG. 5, the insulating layer 19 is provided over the entire surface of the wafer, in which the two electrodes 20 and the insulative single-crystal Si layer 24 provided at the bottom of the slot 23 have been formed. The insulating layer 19 is, for example, a $SiO_2$ film with a thickness of several microns (µm) formed by chemical vapor deposition (CVD) or the like. The insulating layer 19 may be flattened by chemical mechanical polishing (CMP).

In FIG. 6, a part of the insulating layer 19 is removed by etching to expose the electrode 20 and the single-crystal Si layer 24. By this etching process, a thin insulating layer 25 with a thickness of 2 to 5 nm remains on the inner side walls of the two electrodes 20 facing each other. As has been described above, the insulating layer 25 ensures prevention of electrical short circuit between the electrodes 20. Thus, a slot electrode 200 whose inner side walls facing each other across the slot 23 are covered with the thin insulating layer 25 is obtained.

Then, the first layer 26, the second layer 27, and the third layer 28 are epitaxially grown in this order on the single-crystal Si layer 24 and the electrodes 20, whereby the multilayer 50A including the single-crystal Si layer 24 is obtained. Epitaxial growth may be carried out by, for example, a physical vapor deposition (PVD) method such as vacuum evaporation or sputtering, or alternatively, a coating method such as sol-gel method may be used. In the first embodiment, the first layer 26 containing Zr and the second layer 27 containing $ZrO_2$ are formed by vacuum evaporation, and the third layer 28 containing PZT is formed by sputtering.

When performing PVD such as vacuum evaporation or sputtering, the substrate 17 may be heated up to a temperature of 500° C. to 750° C. to promote the epitaxial growth. A part of the wafer may be masked such that the multilayer film 50A does not grow in any unnecessary area to obtain the structure illustrated in FIG. 4.

Figures 7, 8:
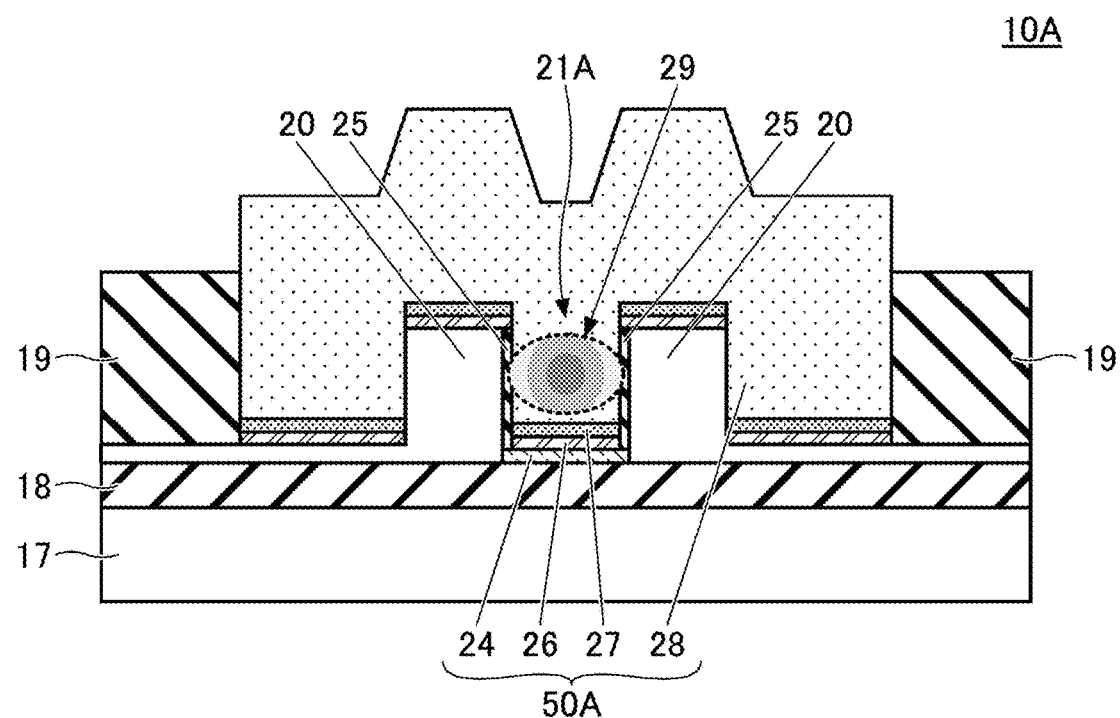
FIG. 7 illustrates physical parameters of crystal layers included in the multilayer film of the first embodiment.
FIG. 8 illustrates a light propagation state of an optical device using the slot waveguide of FIG. 4.

FIG. 7 shows the crystal structures and the physical parameters of the single-crystal Si layer 24, the second layer 27 containing $ZrO_2$, and the third layer 28 containing PZT included in the multilayer film. 50A. $ZrO_2$ is a cubic crystal, and has a lattice constant of 0.514 nm, which is close to the cubic Si lattice constant of 0.543 nm. Therefore, the thin films of the first layer 26 containing Zr and the second layer 27 containing $ZrO_2$ can be epitaxially grown on the single-crystal Si layer 24.

In order to satisfactorily grow the first layer 26 containing Zr and the second layer 27 containing $ZrO_2$ over the high-resistance single-crystal Si layer 24, it may be preferable that no silicon oxide film exists on the surface of the single-crystal Si layer 24. However, in fact, the first layer 26 and the second layer 27 can epitaxially grow even if a very thin natural oxide film exists.

PZT is s tetragonal crystal, and has a lattice constant of 0.401 nm. If the PZT crystal is rotated within a plane by 45 degrees, then the diagonal length of the lattice becomes 0.567 nm, which is close to the lattice constant 0.514 nm of the $ZrO_2$ crystal. During the growing process, PZT spontaneously rotates within a plane by 45 degrees so as to be self-aligned with the underlayer structure. Therefore, the third layer 28 containing PZT can epitaxially grow on the second layer 27 containing $ZrO_2$.

FIG. 8 illustrates a propagation mode of light 29 travelling through the slot waveguide 21A of the optical device 10A. Most of the light 29 is confined near the center of the PZT in the horizontal direction between the two electrodes 20. The silicon which configures the electrodes 20 has a refractive index higher than PZT; however, light can be strongly confined in the PZT slot having a sub-wavelength width sandwiched between the high-refractive index media. In this example, the gap between the two electrodes 20 is 0.1 μm to 0.2 μm, which is capable of sufficiently confining a fiber-optic communication light with a wavelength of 1260 nm to 1675 nm.

The $ZrO_2$ of the second layer 27 and the PZT of the third layer 28 in the multilayer film 50A are dielectrics and transparent to the wavelength of 1260 nm to 1675 nm. There is almost no propagation loss occurring due to light absorption, unlike with a metal such as Pt, or other conductive materials such as $In_2O_3$—$SnO_2$ (ITO) or $SrRuO_3$ (SRO). The first layer 26 containing Zr can be partially or entirely oxidized during or after the film formation. The first layer 26 may also be partially or entirely oxidized by receiving oxygen from the second layer 27 containing $ZrO_2$. Accordingly, the propagation loss due to light absorption in the first layer 26 is negligible.

As indicated in FIG. 7, while the refractive index of PZT is 2.44, the refractive index of $ZrO_2$ is much lower, i.e., 1.54. Accordingly, most of the light 29 is confined in the PZT by the first and second layers in the direction perpendicular to the substrate. This multilayer film contributes to the reduction of propagation loss due to light absorption. Because a part or all of the first layer 26 containing Zr is oxidized, and because the insulating layer 25 is formed on the inner side walls of the electrodes 20 facing each other, electrical short circuit by the first layer 26 is prevented. Even if there is no insulating layer 25 covering the side walls of the electrodes 20, electrical short circuit between the electrodes 20 can be prevented because a part or all of the first layer 26 is oxidized.

The PZT crystal configuring the slot waveguide 21A has the electrooptic effect. When a voltage is applied between the two electrodes 20, the refractive index of the PZT changes, and the effective optical path length changes. By providing an appropriate voltage difference between the two arms (slot waveguide 21) of each of the four child MZ interferometers in FIG. 2, the interference conditions of the respective MZ interferometers change and the optical phases of the light beams can be modulated.

In order to make the PZT crystal of the third layer 23 exhibit the maximum electrooptic effect in the voltage applying direction during the actual use, a voltage higher than the ordinary voltage in normal use may be applied in advance at a high temperature to regulate the polarization of the crystal. This process is called a polarization treatment or poling treatment.

The PZT used in the first embodiment has the electrooptic effect about four times as high as $LiNbO_3$, which is currently the mainstream material used for optical modulators. In other words, the length of the electrode 20 can be reduced to about one fourth of LN optical modulators. Thus, downsizing of the optical device 10A is achieved.

The multilayer film 50A and the optical device 10A using the multilayer film 50A according to the first embodiment can be easily integrated in a Si photonic circuit. The requirements for long-term reliability are also satisfied.

Second Embodiment

Figures 9, 10:
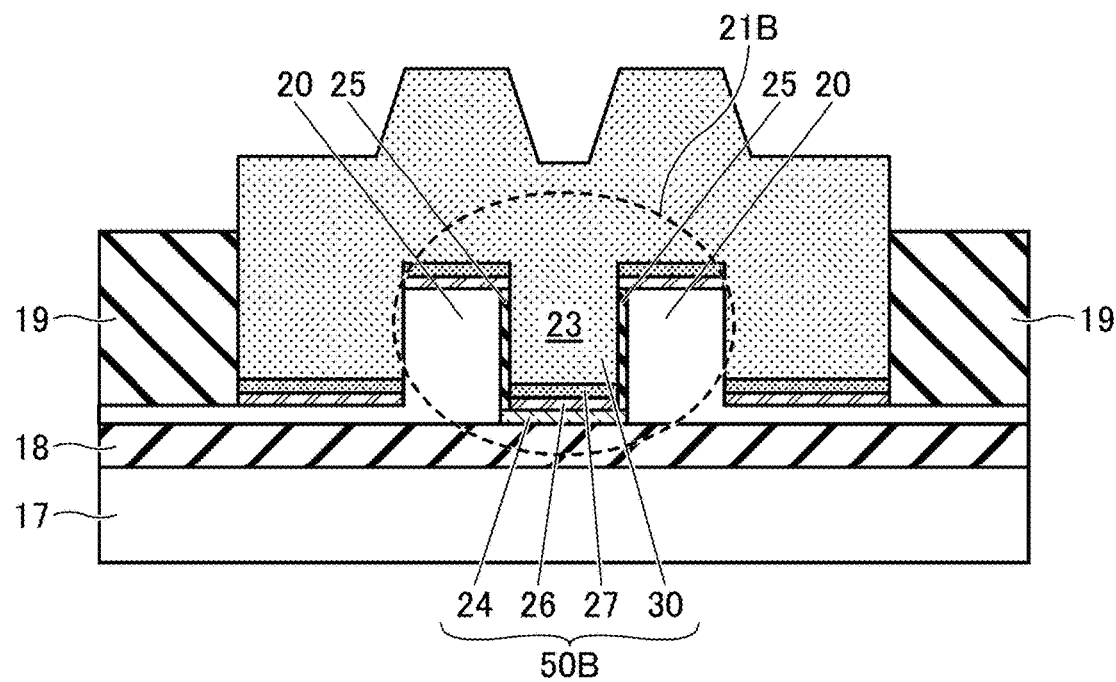
FIG. 9 is a schematic diagram of a slot waveguide having a multilayer film of the second embodiment.
FIG. 10 illustrates physical parameters of crystal layers included in the multilayer film of the second embodiment.

FIG. 9 is a cross-sectional view of a slot waveguide 21B using a multilayer film 50B according to the second embodiment. In the second embodiment, (Pb, La)(Zr, Ti)$O_3$ (hereinafter abbreviated as "PLZT") is used as the perovskite oxide of the third layer 30 included in the multilayer film 50B. The other device configurations are the same as those in the first embodiment. The same components are denoted by the same reference numerals, and redundant description may be omitted.

The multilayer film 503 includes a single-crystal Si layer 24, a first layer 26 containing Zr, a second layer 27 containing $ZrO_2$, and a third layer 30 containing PLZT, provided in this order over the substrate 17. The first layer 26, the second layer 27, and the third layer 30 are epitaxially grown on the single-crystal Si layer 24.

The third layer 30 containing PLZT can be formed by PVD such as vacuum evaporation or sputtering, or a coating method such as a sol-gel method may be employed. In this example, the third layer 30 containing PLZT is formed by sputtering on the second layer 27 containing $ZrO_2$. The La content of the PLZT is 2 to 10 atm. %, more preferably, 8.5 to 9.5 atm. %, and even more preferably, 9 atm. % from the viewpoint of sufficiently exerting the electrooptic effect.

FIG. 10 shows the crystal structures and physical parameters of the single-crystal Si layer 24, the second layer 27 containing $ZrO_2$, and the third layer 30 containing PLZT included in the multilayer film 50B. $ZrO_2$ is a cubic crystal and has a lattice constant of 0.514 nm, which is close to the same type of cubic crystal of Si lattice constant of 0.543 nm. Accordingly, thin films of the first layer 26 containing Zr and a second layer 27 containing $ZrO_2$ can epitaxially grow on the single-crystal Si layer 24.

PLZT is a tetragonal crystal, and has a lattice constant of 0.408 nm. If the PLZT crystal is rotated within a plane by 45 degrees, then the diagonal length of the lattice becomes 0.577 nm, which is close to the lattice constant 0.514 nm of the $ZrO_2$ crystal. The third layer 30 containing PLZT can epitaxially grow on the second layer 27 containing $ZrO_2$.

Figure 11:
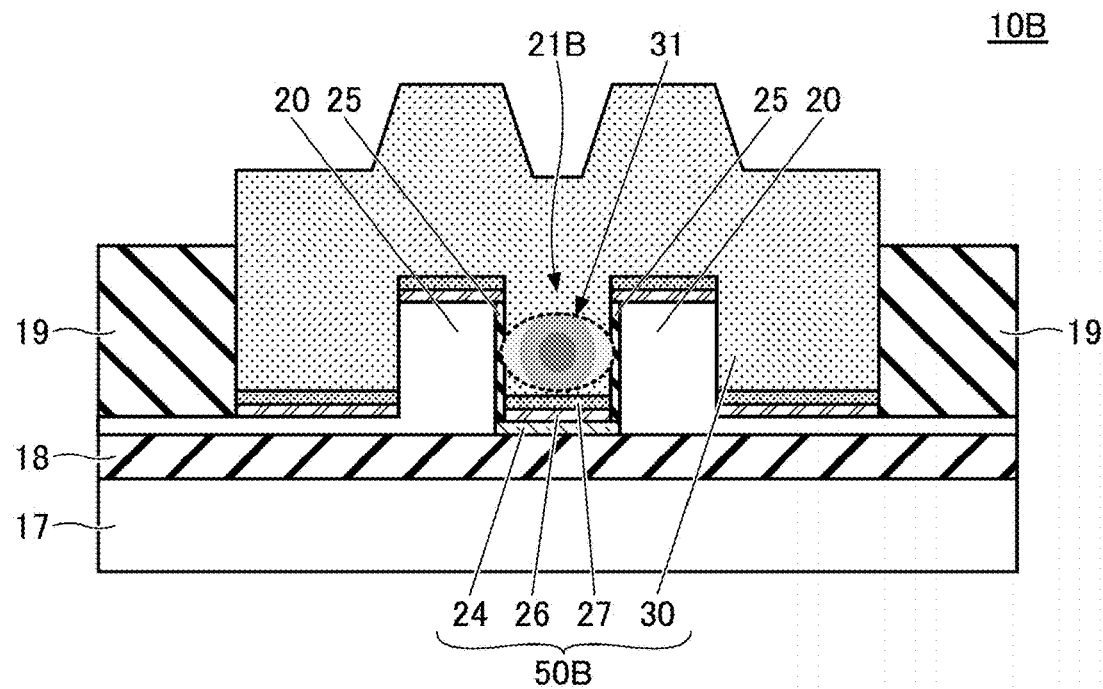
FIG. 11 illustrates a light propagation state of an optical device using the slot waveguide of FIG. 9.

FIG. 11 illustrates a propagation mode of light 31 travelling through the slot waveguide 21B of the optical device 10B. Most of the light 31 is confined near the center of the PLZT in the horizontal direction between the two electrodes 20. The silicon which configures the electrodes 20 has a refractive index higher than PLZT; however, light can be strongly confined in the PLZT slot having a sub-wavelength width sandwiched between the high-refractive index media. In this example, the gap between the two electrodes 20 is 0.1 μm to 0.2 μm, which is capable of sufficiently confining a fiber-optic communication light with a wavelength of 1260 nm to 1675 nm.

The ZrO$_2$ of the second layer 27 and the PLZT of the third layer 30 in the multilayer film 50B are dielectrics and transparent to the wavelength of 1260 nm to 1675 nm, unlike a metal such as Pt, or other conductive materials such as ITO or SRO. There is almost no propagation loss occurring due to light absorption. The first layer 26 containing Zr can be partially or entirely oxidized during or after the film formation. The first layer 26 may also be partially or entirely oxidized by receiving oxygen from the second layer 27 containing ZrO$_2$. Accordingly, the propagation loss due to light absorption in the first layer 26 is negligible.

As indicated in FIG. 10, while the refractive index of PLZT is 2.40, the refractive index of ZrO$_2$ is much lower, i.e., 1.54. Accordingly, most of the light 31 is confined in the PLZT by the first and second layers in the direction perpendicular to the substrate. This multilayer film contributes to the reduction of propagation loss due to light absorption. Because a part or all of the first layer 26 containing Zr is oxidized, and because the insulating layer 25 is formed on the inner side walls of the electrodes 20 facing each other, electrical short circuit by the first layer 26 is prevented. Even if there is no insulating layer 25 covering the side walls of the electrodes 20, electrical short circuit between the electrodes 20 can be prevented because a part or all of the first layer 26 is oxidized.

The PLZT crystal configuring the slot waveguide 21B has the electrooptic effect. When a voltage is applied between the two electrodes 20, the refractive index of the PLZT changes, and the effective optical path length changes. By providing an appropriate voltage difference between the two arms (slot waveguide 21) of each of the child MZ interferometers in FIG. 2, the interference conditions of the respective MZ interferometers change and the optical phases of the light beams can be modulated.

In order to make the PLZT crystal of the third layer 30 exhibit the maximum electrooptic effect in the voltage applying direction during the actual use, the crystal polarization may be regulated by applying a voltage higher than that in normal use at a high temperature.

The PLZT used in the second embodiment has the electrooptic effect about twenty times as high as LiNbO$_3$, which is currently the mainstream material used for optical modulators. In other words, the length of the electrode 20 can be reduced to about one twentieth (1/20) of LN optical modulators. Thus, downsizing of the optical device 10B is achieved.

The multilayer film 50B and the optical device 10B using the multilayer film 50B according to the second embodiment can be easily integrated in a Si photonic circuit. The requirements for long-term reliability are also satisfied.

Third Embodiment

Figure 12:
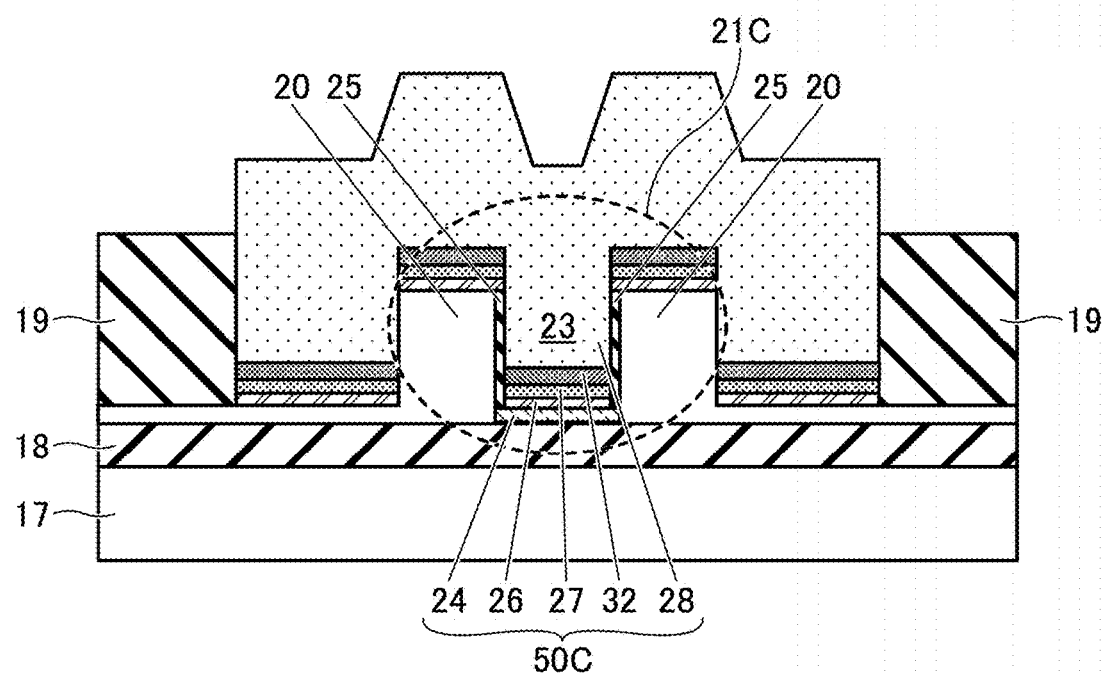
FIG. 12 is a schematic diagram of a slot waveguide having a multilayer film of the third embodiment.

FIG. 12 is a cross-sectional view of a slot waveguide 21C using a multilayer film 50C according to the third embodiment. The multilayer film 50C of the third embodiment includes a high-resistance single-crystal Si layer 24, a first layer 26 containing Zr, a second layer 27 containing ZrO$_2$, a SrTiO$_3$ (STO) layer 32, and a third layer 28 containing PZT, provided in this order over the substrate 17. The first layer 26, the second layer 27, the STO layer 32, and the third layer 26 are epitaxially grown on the single-crystal Si layer 24. Compared with the first embodiment, the layer 32 containing STO is inserted between the second layer 27, which contain ZrO$_2$ as the main component, and the third layer 28, which contains PZT as the main component. The other configurations of the multilayer film 51C are the same as those in the first embodiment. The same components are denoted by the same reference numerals, and redundant description may be omitted.

The multilayer film 50C can be fabricated by PVD such as vacuum evaporation or sputtering, or alternatively, a coating method such as a sol-gel method may be employed. In this example, the first layer 26 containing Zr and the second layer 27 containing ZrO$_2$ are formed by vacuum evaporation, and the layer 32 containing STO and the third layer 23 containing PZT are formed by sputtering.

Figures 13, 14:
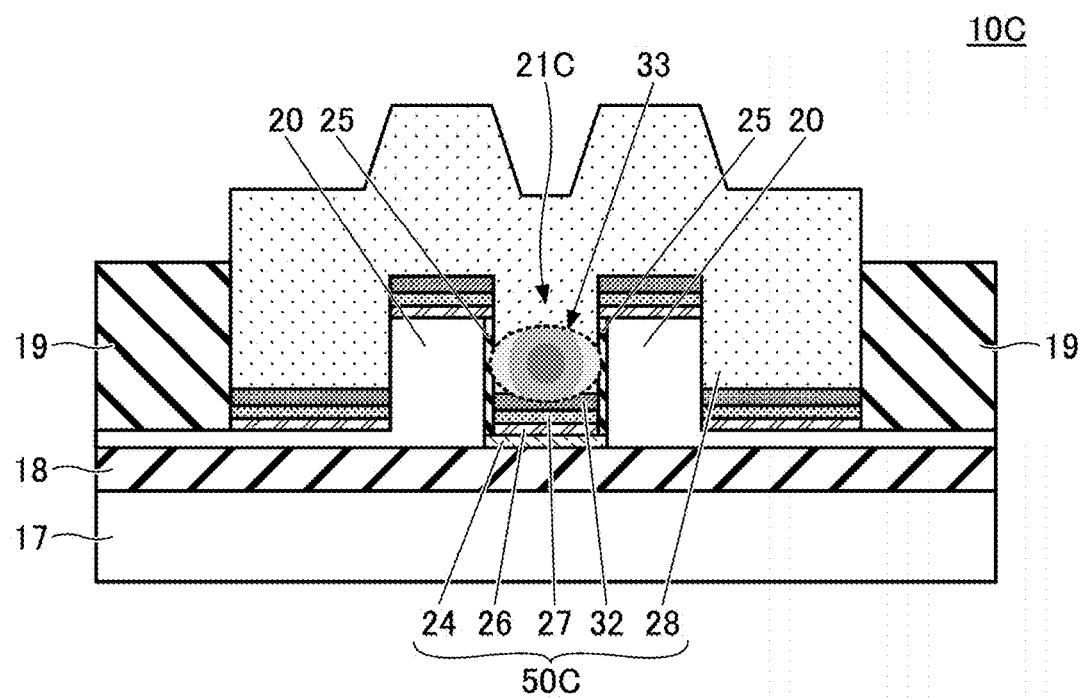
FIG. 13 illustrates physical parameters of crystal layers included in the multilayer film of the third embodiment.
FIG. 14 illustrates a light propagation state of an optical device using the slot waveguide of FIG. 12.

FIG. 13 shows the crystal structures and physical parameters of the single-crystal Si layer 24, the second layer 27 containing ZrO$_2$, the layer 32 containing STO, and the third layer 28 containing PZT, which are included in the multilayer film 50C. As has been described above, thin films of the first layer 26 containing Zr and a second layer 27 containing ZrO$_2$ can epitaxially grow on the single-crystal Si layer 24 because of the close lattice constants.

STO is a cubic crystal, like ZrO$_2$, and has a lattice constant of 0.391 nm. The STO crystal spontaneously rotates within a plane by 45 degrees during the growth, and the diagonal length of the lattice becomes 0.553 nm, which is close to the lattice constant 0.514 nm of the ZrO$_2$ crystal. Accordingly, the layer 32 containing STO can epitaxially grow on the second layer 27 containing ZrO$_2$. PZT is a tetragonal crystal, and has a lattice constant of 0.401 nm, which is close to the lattice constant of STO. The third layer 28 containing PZT can epitaxially grow on the layer 32 containing STO.

FIG. 14 illustrates a propagation mode of light 33 travelling through the slot waveguide 21C of the optical device IOC. Most of the light 33 is confined near the center of the PZT in the horizontal direction between the two electrodes 20.

The ZrO$_2$ of the second layer 27, the layer 32 containing STO, and the PZT of the third layer 28 in the multilayer film 50C are dielectrics and transparent to the wavelength of 1260 nm to 1675 nm, unlike a metal such as Pt, or other conductive materials such as ITO or SRO. There is almost no propagation loss occurring due to light absorption in these layers.

As indicated in FIG. 13, while the refractive indexes of STO and PZT are 2.28 and 2.44, respectively, the refractive index of ZrO$_2$ is much lower, i.e., 1.54. Accordingly, most of the light 33 is confined in the PZT by the first and second layers in the direction perpendicular to the substrate. This multilayer film contributes to the reduction of propagation loss due to light absorption.

As has already been described above, the length of the slot waveguide 21C can be reduced to about 1/4 of the waveguide length of a typical LN optical modulator owing to the electrooptic effect of PZT. The multilayer film 50C and the optical device IOC using the multilayer film 50C of the third embodiment can be easily integrated in a Si photonic circuit. The requirements for long-term reliability are also satisfied.

Fourth Embodiment

Figures 15, 16:
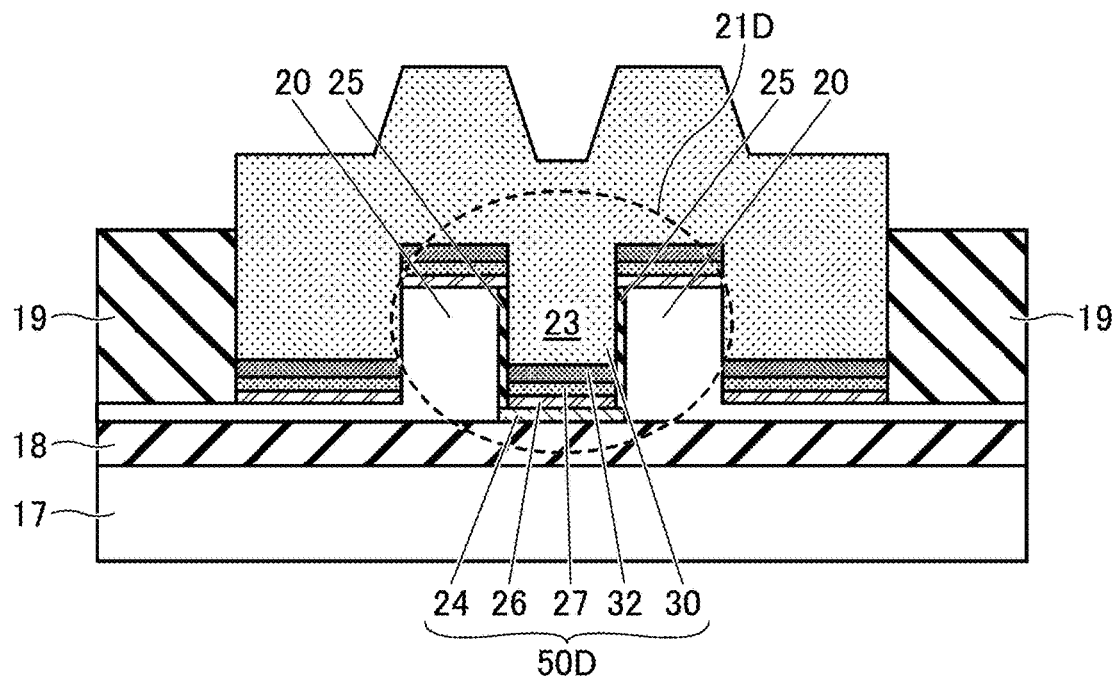
FIG. 15 is a schematic diagram of a slot waveguide having a multilayer film of the fourth embodiment.
FIG. 16 illustrates physical parameters of crystal layers included in the multilayer film of the fourth embodiment.

FIG. 15 is a cross-sectional view of a slot waveguide 21D using a multilayer film 50D according to the fourth embodiment. The multilayer film 50C of the fourth embodiment includes a high-resistance single-crystal Si layer 24, a first layer 26 containing Zr, a second layer 27 containing ZrO$_2$, a SrTiO$_3$ (STO) layer 32, and a third layer 30 containing PLZT provided in this order over the substrate 17. The first layer 26, the second layer 27, the STO layer 32, and the third layer 30 are epitaxially grown on the single-crystal Si layer 24. For the third layer 30, PLZT is used in place of PZT of the multilayer film 50C of the third embodiment.

The configurations other than the multilayer film 50D are the same as those in the first embodiment. The same components are denoted by the same reference numerals, and redundant description may be omitted. The process for fabricating the multilayer film 50D is as such already described above in the first to third embodiments.

FIG. 16 shows the crystal structures and physical parameters of the single-crystal Si layer 24, the second layer 27 containing $ZrO_2$, the layer 32 containing STO, and the third layer 30 containing PLZT, which are included in the multilayer film 50D. As has been described above, thin films of the first layer 26 containing Zr and a second layer 27 containing $ZrO_2$ can epitaxially grow on the single-crystal Si layer 24.

STO is a cubic crystal, like $ZrO_2$, and the lattice constant of 0.391 nm. The STO crystal spontaneously rotates within a plane by 45 degrees during the growth, and the diagonal length of the lattice becomes 0.553 nm, which is close to the lattice constant 0.514 nm of the $ZrO_2$ crystal. Accordingly, the layer 32 containing STO can epitaxially grow on the second layer 27 containing $ZrO_2$. PLZT is a tetragonal crystal, and has a lattice constant of 0.408 nm, which is close to the lattice constant of STO. The third layer 30 containing PLZT can epitaxially grow on the layer 32 containing STO.

Figure 17:
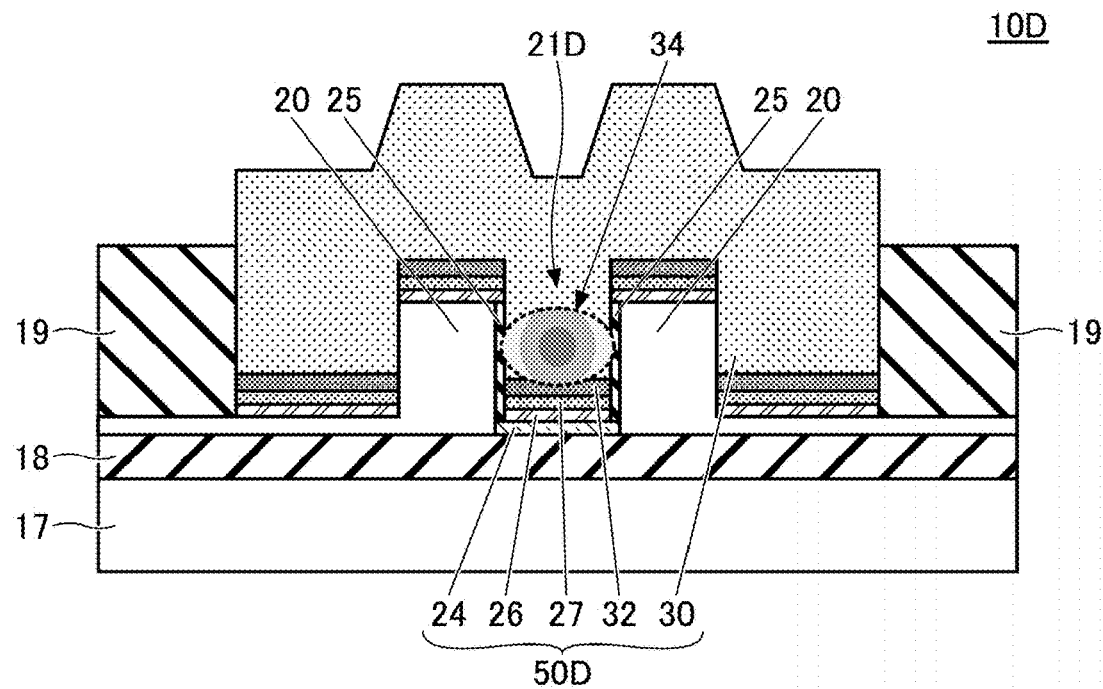
FIG. 17 illustrates a light propagation state of an optical device using the slot waveguide of FIG. 15.

FIG. 17 illustrates a propagation mode of light 34 travelling through the slot waveguide 21D of the optical device 10D. Most of the light 34 is confined near the center of the PLZT in the horizontal direction between the two electrodes 20.

The $ZrO_2$ of the second layer 27, the layer 32 containing STO, and the PLZT of the third layer 30 in the multilayer film 50D are dielectrics and transparent to the wavelength of 1260 nm to 1675 nm, unlike a metal such as Pt, or other conductive materials such as ITO or SRO. There is almost no propagation loss occurring due to light absorption in these layers.

As indicated in FIG. 16, while the refractive indexes of STO and PLZT are 2.28 and 2.40, respectively, the refractive index of $ZrO_2$ is much lower, i.e., 1.54. Accordingly, most of the light 34 is confined in the STO and PLZT by the first and second layers in the direction perpendicular to the substrate. This multilayer film contributes to the redaction of propagation loss due to light absorption.

As has already been described above, the length of the slot waveguide 21D can be reduced to about ¹⁄₂₀ of the waveguide length of a typical LN optical modulator owing to the electrooptic effect of PLZT. The multilayer film 50D and the optical device 10D using the multilayer film 50D of the fourth embodiment can be easily integrated in a Si photonic circuit. The requirements for long-term reliability area also satisfied.

Fifth Embodiment

Figure 18:
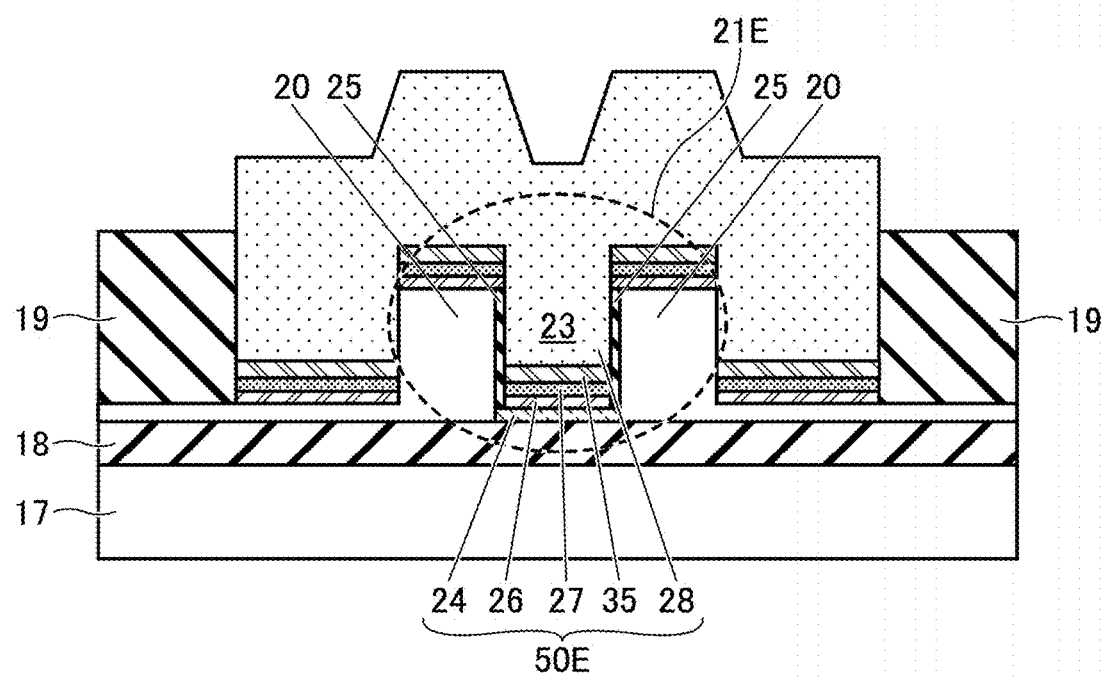
FIG. 18 is a schematic diagram of a slot waveguide having a multilayer film of the fifth embodiment.

FIG. 18 is a cross-sectional view of a slot waveguide 21E using a multilayer film 50E according to the fifth embodiment. The multilayer film 50E of the fifth embodiment includes a high-resistance single-crystal Si layer 24, a first layer 26 containing Zr, a second layer 27 containing $ZrO_2$, a layer 35 containing MgO, and a third layer 28 containing PZT, provided in this order over the substrate 17. The first layer 26, the second layer 27, the layer 35 containing MgO, and the third layer 28 are epitaxially grown on the single-crystal Si layer 24.

Compared with the third embodiment, the layer 35 containing MgO is inserted, in place of the layer 32 containing STO, between the second layer 27 containing $ZrO_2$ and the third layer 28 containing PZT. The configurations other than the multilayer film 50E are the same as those in the third embodiment. The same components are denoted by the same reference numerals, and redundant description may be omitted. The layer 35 containing MgO is formed by, for example, sputtering, like the layer 32 containing STO.

Figures 19, 20:
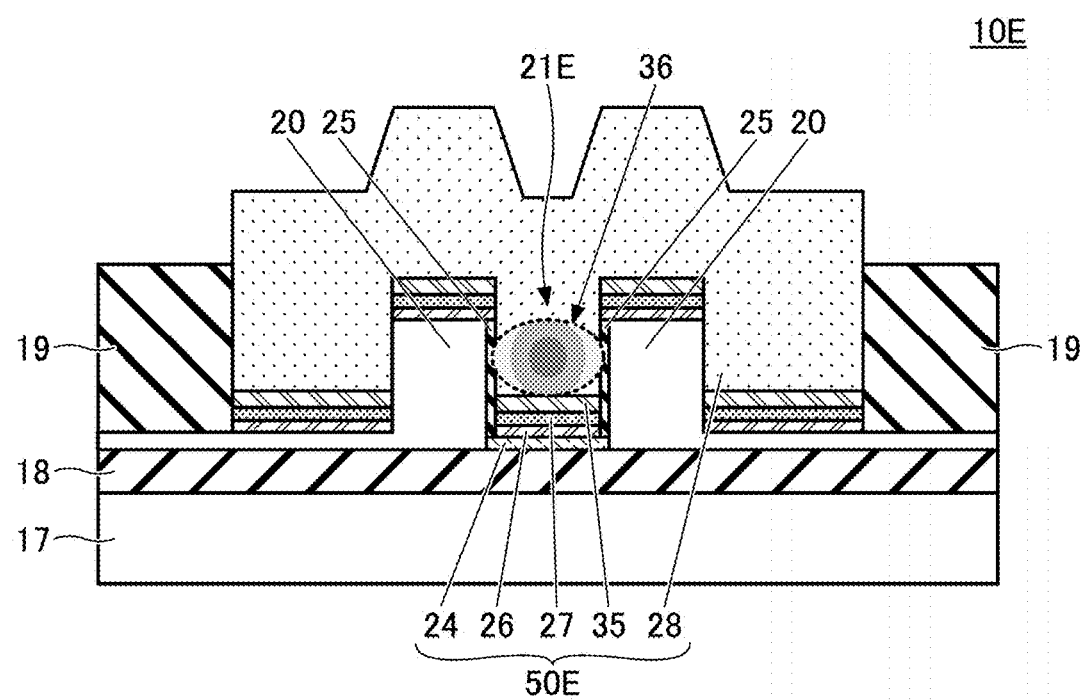
FIG. 19 illustrates physical parameters of crystal layers included in the multilayer film of the fifth embodiment.
FIG. 20 illustrates a light propagation state of an optical device using the slot waveguide of FIG. 18.

FIG. 19 shows the crystal structures and physical parameters of the single-crystal Si layer 24, the second layer 27 containing $ZrO_2$, the layer 35 containing MgO, and the third layer 28 containing PZT, which are included in the multilayer film 50E. MgO is a cubic crystal, like $ZrO_2$, and the lattice constant of 0.421 nm. The MgO crystal spontaneously rotates within a plane by 45 degrees during the growth, and the diagonal length of the lattice becomes 0.595 nm, which is close to the lattice constant 0.514 nm of the $ZrO_2$ crystal. Accordingly, the layer 35 containing MgO can epitaxially grow on the second layer 27 containing $ZrO_2$. PZT is a tetragonal crystal, and has a lattice constant of 0.401 nm, which is close to the lattice constant of MgO. The third layer 28 containing PZT can epitaxially grow on the layer 35 containing MgO.

FIG. 20 illustrates a propagation mode of light 36 travelling through the slot waveguide 21E of the optical device 10E. Most of the light 36 is confined near the center of the PZT of the third layer 28 in the horizontal direction between the two electrodes 20.

The $ZrO_2$ of the second layer 27, the layer 35 containing MgO, and the PZT of the third layer 28 included in the multilayer film 50E are dielectrics and transparent to the wavelength of 1260 nm to 1675 nm, unlike a metal such as Pt, or other conductive materials such as ITO or SRO. There is almost no propagation loss occurring due to light absorption in these layers.

As indicated in FIG. 19, while the refractive index of PZT is 2.44, the refractive indexes of MgO and $ZrO_2$ are lower, namely, 1.71 and 1.54, respectively. Accordingly, most of the light 36 is confined in the PZT by the first and second layers in the direction perpendicular to the substrate. This multilayer film contributes to the reduction of propagation loss due to light absorption.

As has already been described above, the length of the slot waveguide 21E can be reduced to about ¼ of the waveguide length of a typical LN optical modulator owing to the electrooptic effect of PZT. The multilayer film 50E and the optical device 10E using the multilayer film 50E of the fifth embodiment can be easily integrated in a Si photonic circuit. The requirements for long-term reliability are also satisfied.

Sixth Embodiment

Figures 21, 22:
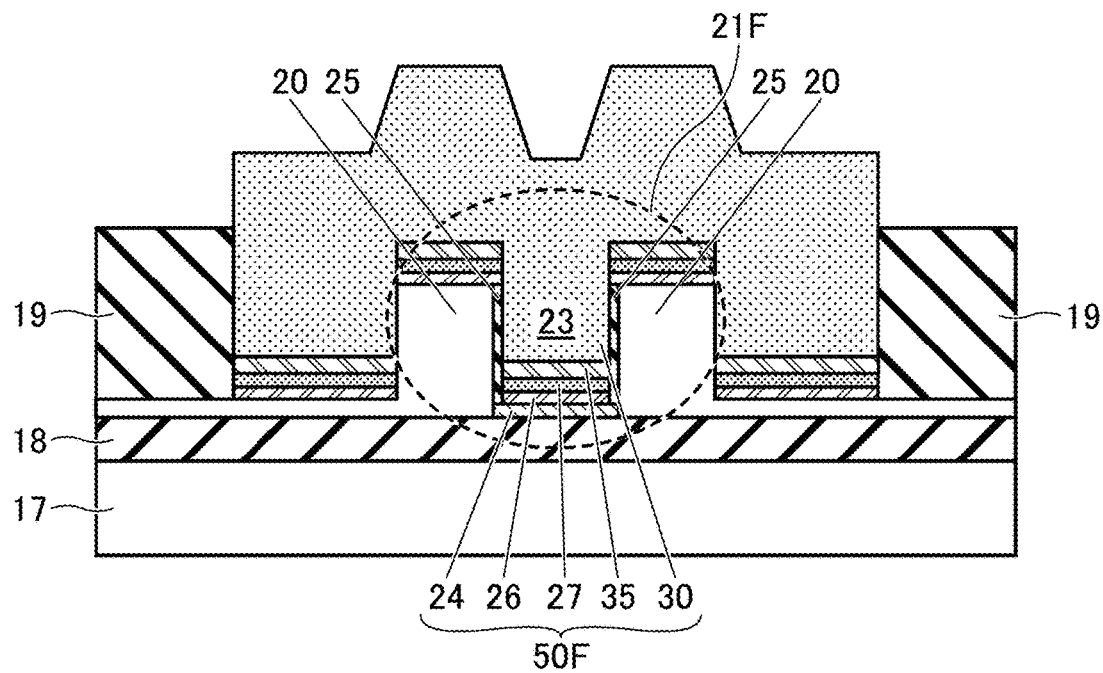
FIG. 21 is a schematic diagram of a slot waveguide having a multilayer film of the sixth embodiment.
FIG. 22 illustrates physical parameters of crystal layers included in the multilayer film of the sixth embodiment.

FIG. 21 is a cross-sectional view of a slot waveguide 21F using a multilayer film 50F according to the sixth embodiment. The multilayer film 50F of the sixth embodiment Includes a high-resistance single-crystal Si layer 24, a first layer 26 containing Zr, a second layer 27 containing $ZrO_2$, a layer 35 containing MgO, and a third layer 30 containing PLZT, provided in this order over the substrate 17. The first layer 26, the second layer 27, the layer 35 containing MgO, and the third layer 30 are epitaxially grown on the single-crystal Si layer 24.

Compared with the fourth embodiment, the layer 35 containing MgO is inserted, in place of the layer 32 containing STO, between the second layer 27 containing $ZrO_2$ and the third layer 30 containing PLZT. The configurations other than the multilayer film 50F are the same as those in the third and the fourth embodiments. The same components are denoted by the same reference numerals, and redundant description may be omitted. The layer 35 containing MgO is formed by, for example, sputtering, like the layer 32 containing STO.

FIG. 22 shows the crystal structures and physical parameters of the single-crystal Si layer 24, the second layer 27 containing $ZrO_2$, the layer 35 containing MgO, and the third layer 30 containing PLZT, which are included in the multilayer film 50F. MgO is a cubic crystal, like $ZrO_2$, and the lattice constant of 0.421 nm. The MgO crystal spontaneously rotates within a plane by 45 degrees during the growth, and the diagonal length of the lattice becomes 0.595 nm, which is close to the lattice constant 0.514 nm of the $ZrO_2$ crystal. Accordingly, the layer 35 containing MgO can epitaxially grow on the second layer 27 containing $ZrO_2$. PLZT is a tetragonal crystal, and has a lattice constant of 0.408 nm, which is close to the lattice constant of MgO. The third layer 30 containing PLZT can epitaxially grow on the layer 35 containing MgO.

Figure 23:
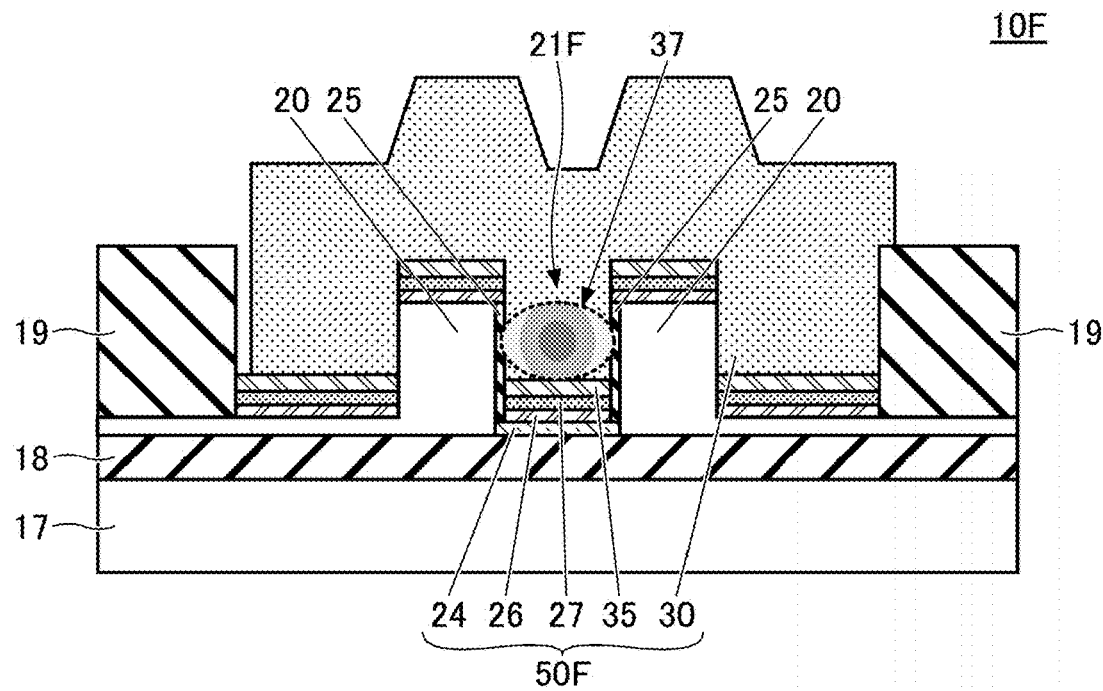
FIG. 23 illustrates a light propagation state of an optical device using the slot waveguide of FIG. 21.

FIG. 23 illustrates a propagation mode of light 37 travelling through the slot waveguide 21F of the optical device 10F. Most of the light 37 is confined near the center of the PLZT of the third layer 30 in the horizontal direction between the two electrodes 20.

The $ZrO_2$ of the second layer 27, the layer 35 containing MgO, and the PLZT of the third layer 30 included in the multilayer film 50F are dielectrics and transparent to the wavelength of 1260 nm to 1675 nm, unlike a metal such as Pt, or other conductive materials such as ITO or SRO. There is almost no propagation loss occurring due to light absorption in these layers.

As indicated in FIG. 22, while the refractive index of PLZT is 2.40, the refractive indexes of MgO and $ZrO_2$ are lower, namely, 1.71 and 1.54, respectively. Accordingly, most of the light 37 is confined in the PLZT by the first and second layers in the direction perpendicular to the substrate. This multilayer film contributes to the reduction of propagation loss due to light absorption.

As has already been described above, the length of the slot waveguide 21F can be reduced to about 1/20 of the waveguide length of a typical LN optical modulator owing to the electrooptic effect of PLZT. The multilayer film 50F and the optical device 10F using the multilayer film 50F of the sixth embodiment can be easily integrated in a Si photonic circuit. The requirements for long-term reliability are also satisfied.

Seventh Embodiment

Figure 24:
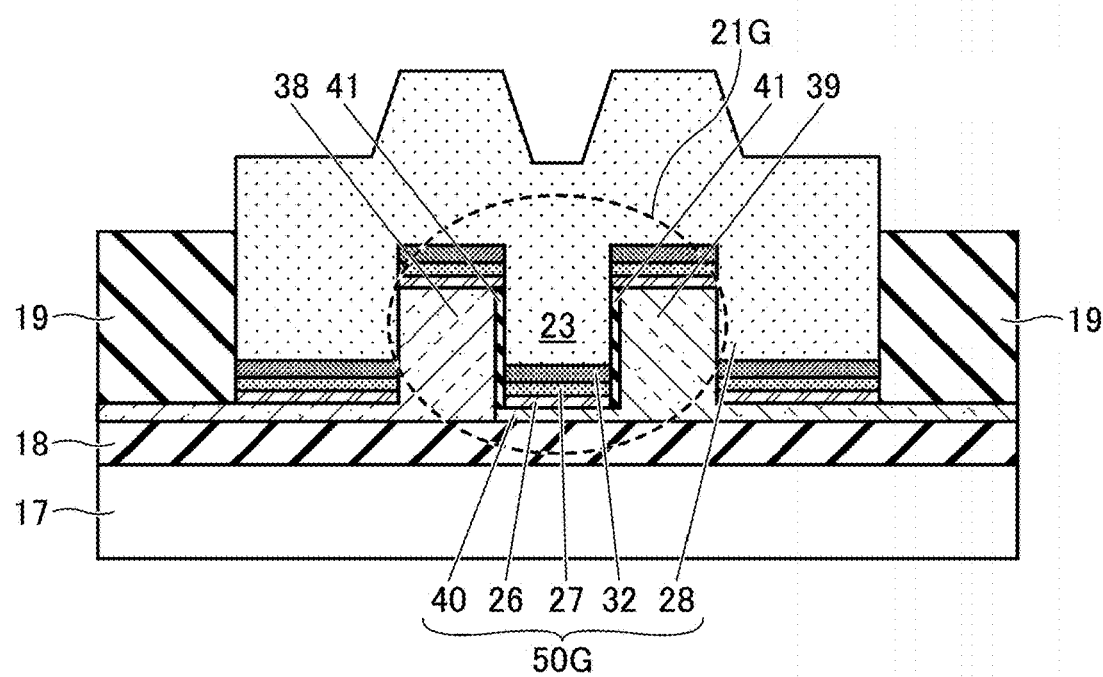
FIG. 24 is a schematic diagram of a slot waveguide having a multilayer film of the seventh embodiment.

FIG. 24 is a cross-sectional view of a slot waveguide 21G using a multilayer film 50G according to the seventh embodiment. In the seventh embodiment, a $SiO_2$ layer 18 is formed on the Si substrate 17. One electrode 38 is formed of a single-crystal Si of a first conductive type (for example, P-type), and the other electrode 39 is formed of a single-crystal Si of a second conductive type (for example, N-type) on the $SiO_2$ layer 18. The electrodes 38 and 39 are provided close to each other to form a slot 23 between them. The bottom surface of the slot 23 between the electrodes 38 and 39 is an N-type single-crystal Si layer 40.

The P-type electrode 38 is fabricated by, for example, implanting boron (B) ions, and the N-type electrode 39 is fabricated by implanting phosphorous (P) ions.

The multilayer film 50G includes a high-resistance single-crystal Si layer 40, a first layer 26 containing Zr, a second layer 27 containing $ZrO_2$, a layer 32 containing STO, and a third layer 28 containing PZT, provided in this order over the substrate 17. The first layer 26, the second layer 27, the layer 32 containing STO, and the third layer 28 are epitaxially grown on the single-crystal Si layer 40.

The lattice constant of $ZrO_2$ cubic crystal is 0.514 nm, which is close to the lattice constant 0.543 nm of cubic Si crystal (see FIG. 13). Accordingly, the second layer 27 containing $ZrO_2$ can epitaxially grow on the N-type single-crystal Si layer 40. As has been described above, the layer 32 containing STO can epitaxially grow on the second layer 27 containing $ZrO_2$, and the third layer 28 containing PZT can epitaxially grow on the layer 32 containing STO.

Figure 25:
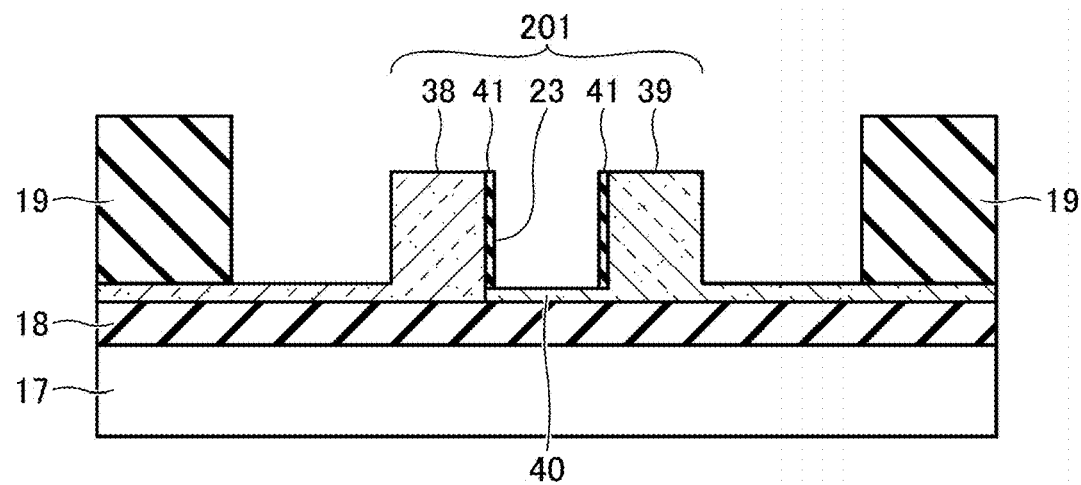
FIG. 25 is a diagram for explaining fabrication of a slot electrode.

FIG. 25 illustrates fabrication of a slot electrode 201 of the seventh embodiment. On the $SiO_2$ layer 18, the P-type electrode 38, the N-type electrode 39, and the N-type single-crystal Si layer 40 located at the bottom surface of the slot 23 between the electrodes are formed. Next, an insulating layer 19 is formed and flattened over the entire surface of the wafer. Then, an area in which the multilayer film 50G is to be formed is etched so as to expose the electrode 33, the electrode 39, and the N-type single-crystal Si layer 40. As a result of this etching process, a thin insulating layer 41 remains on the inner side walls of the electrodes 38 and 39. Thus, the slot electrode 201 is formed, in which the side walls facing each other across the slot 23 are covered with a thin insulating layer 41 having a thickness of about 2 to 5 nm.

In the seventh embodiment, a negative potential is imparted to the electrode 38 formed of the P-type single-crystal Si, and a positive potential is imparted to the other electrode 39 formed of the N-type single-crystal Si and the N-type single-crystal Si layer 40 (reverse bias). Because of a property of the PN junction diode, no current flows from the N-type single-crystal Si electrode 39 and the N-type single-crystal Si layer 40 at the positive potential to the P-type single-crystal Si electrode 38 at the negative potential. Accordingly, a predetermined voltage required to operate the optical device can be applied between the electrodes 38 and 39 without causing electrical short circuit between them.

The thickness of the N-type single-crystal Si layer 40 provided between the electrodes 38 and 39 is 1/3 or less, more preferably 1/5 or less of the height of the electrodes 38 and 39 from the viewpoint of improving the voltage applying efficiency.

After the fabrication of the slot electrode 201, the first layer 26 containing Zr, the second layer 27 containing $ZrO_2$, the layer 32 containing STO, and the third layer 28 containing PZT are epitaxially grown in this order on the N-type single-crystal Si layer 40 and the electrodes 38 and 39. Thus, the multilayer film 50G including the single-crystal Si layer 40 is fabricated.

Figure 26:
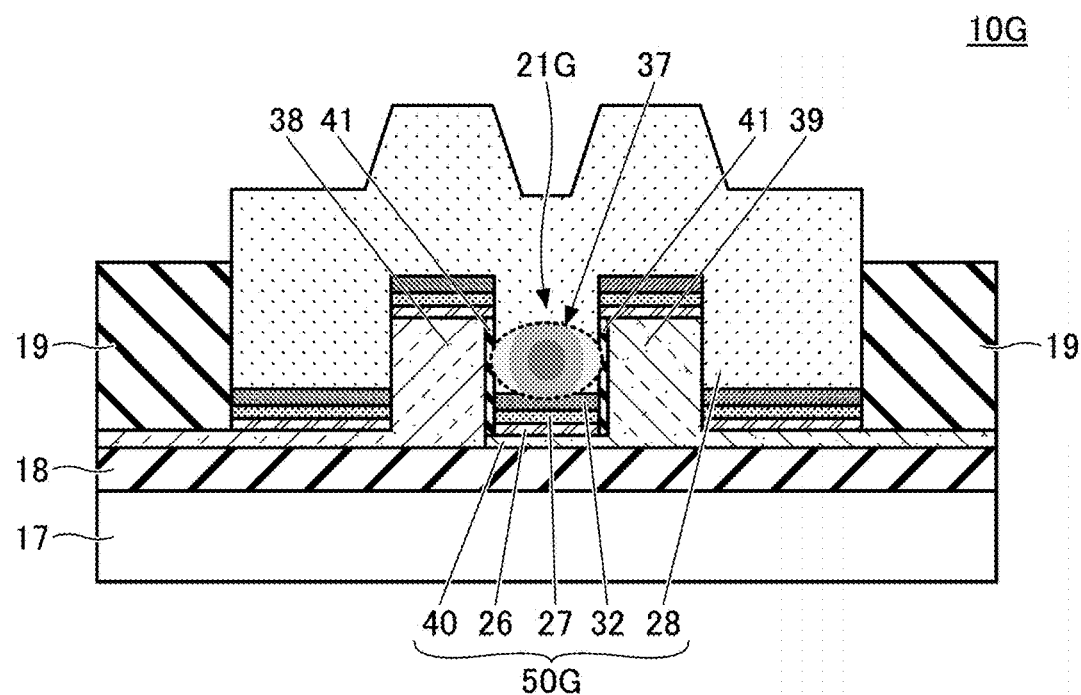
FIG. 26 illustrates a light propagation state of an optical device using the slot waveguide of FIG. 24.

FIG. 26 illustrates a propagation mode of light 37 travelling through the slot waveguide 21G of the optical device 10G. Most of the light 37 is confined in the horizontal direction toward the center of the third layer 28 of the PZT inside the slot between the electrodes 38 and 39. As illustrated in FIG. 13, the refractive indexes of STO and PZT are 2.28 and 2.44, respectively, while the refractive index of $ZrO_2$ is much lower, i.e., 1.54. Accordingly, most of the light 37 is confined in the STO and PZT by the first and second layers in the direction perpendicular to the substrate. This multilayer film contributes to the reduction of propagation loss due to light absorption.

As has already been described above, the length of the slot waveguide 21G can be reduced to about 1/4 of the waveguide length of a typical LN optical modulator owing to the electrooptic effect of PZT. The multilayer film 50G and the optical device 10G using the multilayer film 50G of the seventh embodiment can be easily integrated in a Si photonic circuit. The requirements for long-term reliability are also satisfied.

Although, in the seventh embodiment, the multilayer film formed over the N-type single-crystal Si layer 40 and the electrodes employs the configuration of the epitaxial growth of the third embodiment, multilayer configurations of the first, the second, the fourth, the fifth, or the sixth embodiment may be employed. When PLZT is used as the third layer, the waveguide length can be reduced to 1/20 of that of a typical LN optical modulator.

Eighth Embodiment

Figure 27:
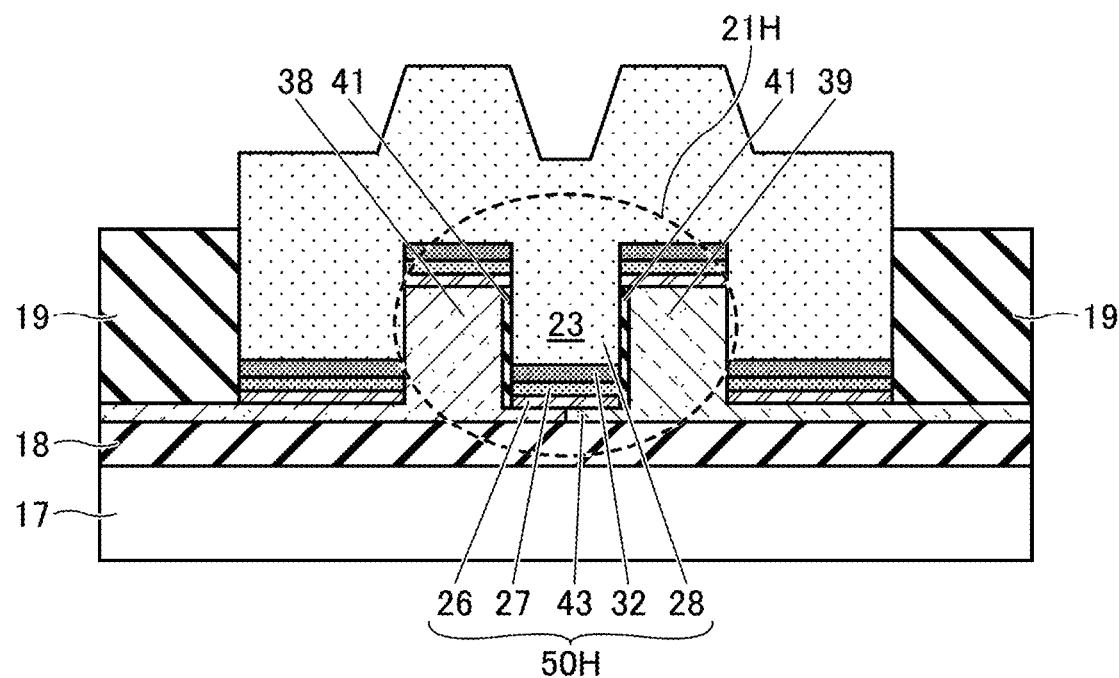
FIG. 27 is a schematic diagram of a slot waveguide having a multilayer film of the eighth embodiment.

FIG. 27 is a cross-sectional view of a slot waveguide 21H using a multilayer film 50H according to the eighth embodiment. In the eighth embodiment, a pair of electrodes with different conductive types are formed on a $SiO_2$ layer 18 that is formed on the Si substrate 17. One electrode 38 is formed of a single-crystal Si of a first conductive type (for example, P-type), and the other electrode 39 is formed of a single-crystal Si of a second conductive type (for example, N-type). The electrodes 38 and 39 are provided close to each other to form a slot 23 between them. The bottom surface of the slot 23 between the electrodes 38 and 39 is a single-crystal Si layer 43 with a PN junction.

The multilayer film 50H includes the PN junction single-crystal Si layer 43, a first layer 26 containing Zr, a second layer 27 containing $ZrO_2$, a layer 32 containing STO, and a third layer 28 containing PZT, provided in this order over the substrate 17. The first layer 26, the second layer 27, the layer 32 containing STO, and the third layer 28 are epitaxially grown on the PN junction single-crystal Si layer 43. In place of this multilayer epitaxial configuration based upon the third embodiment, the epitaxial growth configuration of the first, the second, the fourth, the fifth, or the sixth embodiment may be employed.

Figure 28:
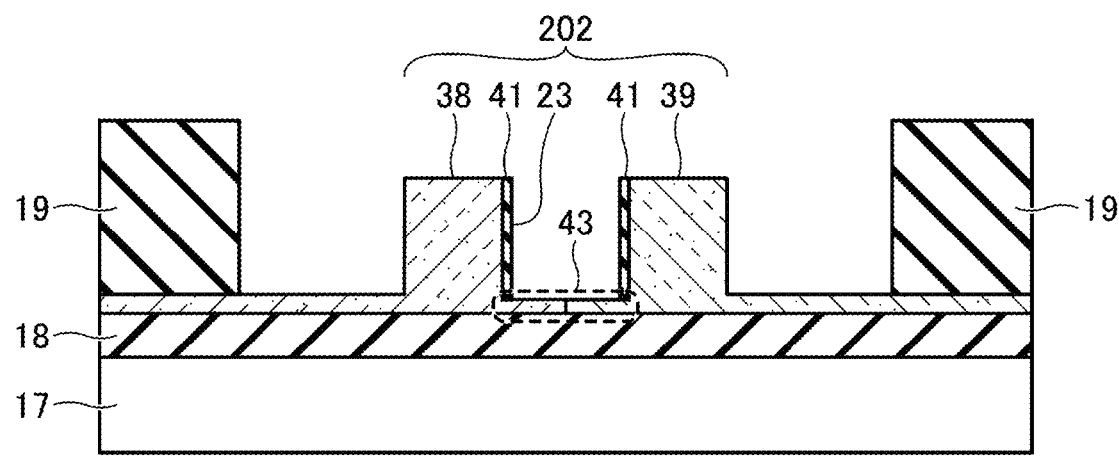
FIG. 28 is a diagram for explaining fabrication of a slot electrode.

FIG. 28 illustrates fabrication of a slot electrode 202 of the eighth embodiment. On the $SiO_2$ layer 18, the P-type electrode 38, the N-type electrode 39, and the PN-junction single-crystal Si layer 43 located at the bottom surface of the slot 23 between the electrodes are formed. Next, an insulating layer 19 is formed and flattened over the entire surface of the wafer. Then, an area in which the multilayer film 50H is to be formed is etched so as to expose the electrode 38, the electrode 39, and the PN junction single-crystal Si layer 43. As a result of this etching process, a thin insulating layer 41 with a thickness of 2 to 5 nm remains on the inner side walls of the electrodes 38 and 39. Thus, the slot electrode 201 is formed, in which the side walls facing each other across the slot 23 are covered with a thin insulating layer 41.

In the eighth embodiment, a negative potential is imparted to the P-type single-crystal Si electrode 38 and the P-type region of the PN junction single-crystal Si layer 43, and a positive potential is imparted to the N-type single-crystal Si electrode 39 and the N-type region of the PN junction single-crystal Si layer 43 (reverse bias). Because of the property of the PN junction diode, no current flows from the N-type single-crystal Si electrode 39 and the N-type region of the PN junction single-crystal Si layer 43 at the positive potential to the P-type single-crystal Si electrode 38 and the P-type region of the PN-junction single-crystal Si layer 43 at the negative potential. Accordingly, a predetermined voltage required to operate the optical device can be applied between the electrodes 38 and 39 without causing electrical short circuit between them.

The thickness of the PN junction single-crystal Si layer 43 provided between the electrodes 38 and 39 is 1/3 or less, more preferably 1/5 or less of the height of the electrodes 38 and 39 from the viewpoint of improving the voltage applying efficiency, namely, of reducing the applied voltage.

After the fabrication of the slot electrode 202, the first layer 26 containing Zr, the second layer 27 containing $ZrO_2$, the layer 32 containing STO, and the third layer 28 containing PZT are epitaxially grown in this order on the PN-junction single-crystal Si layer 43 and the electrodes 38 and 39. Thus, the multilayer film 50H including the PN-junction single-crystal Si layer 43 is fabricated.

Figure 29:
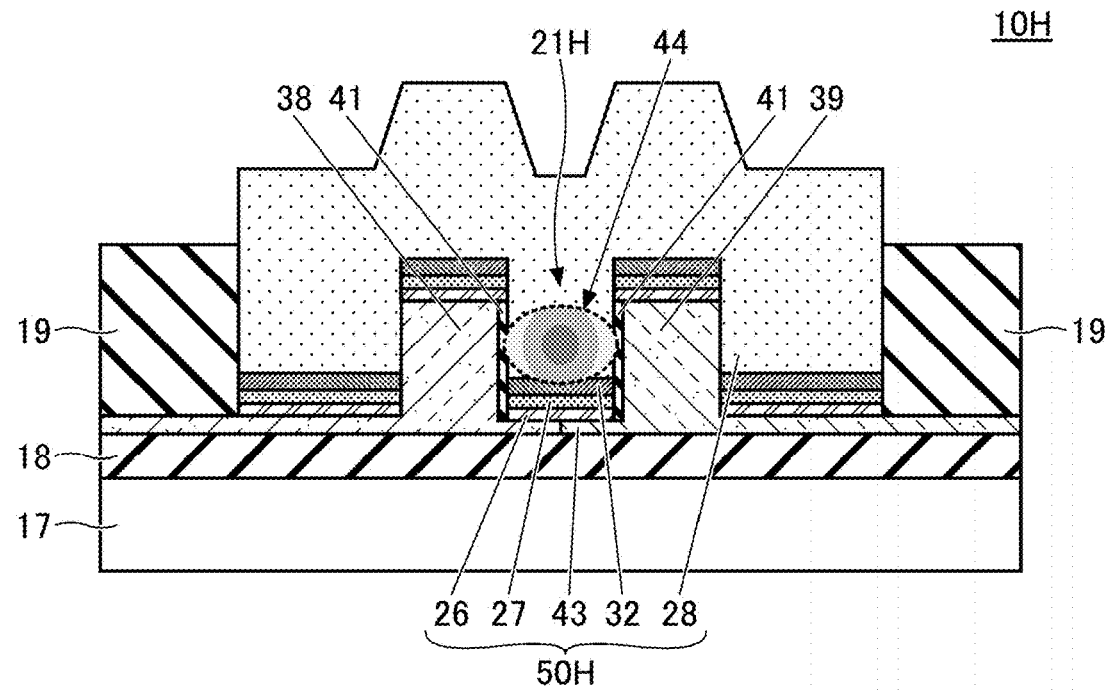
FIG. 29 illustrates a light propagation state of an optical device using the slot waveguide of FIG. 27.

FIG. 29 illustrates a propagation mode of light 44 travelling through the slot waveguide 21H of the optical device 10H. Most of the light 44 is confined in the horizontal direction toward the center of the third layer 28 of the PZT inside the slot between the electrodes 38 and 39. As illustrated in FIG. 13, the refractive indexes of STO and PZT are 2.28 and 2.44, respectively, while the refractive index of $ZrO_2$ is much lower, i.e., 1.54. Accordingly, most of the light 44 is confined in the STO and PZT by the first and second layers in the direction perpendicular to the substrate. This multilayer film contributes to the reduction of propagation loss due to light absorption.

As has already been described above, the length of the slot waveguide 21H can be reduced to about 1/4 of the waveguide length of a typical LN optical modulator owing to the electrooptic effect of PZT. When PLZT is used as the third layer, the waveguide length can be further reduced. The multilayer film 50H and the optical device 10H using the multilayer film 50H of the eighth embodiment can be easily integrated in a Si photonic circuit. The requirements for long-term reliability are also satisfied.

Ninth Embodiment

Figure 30:
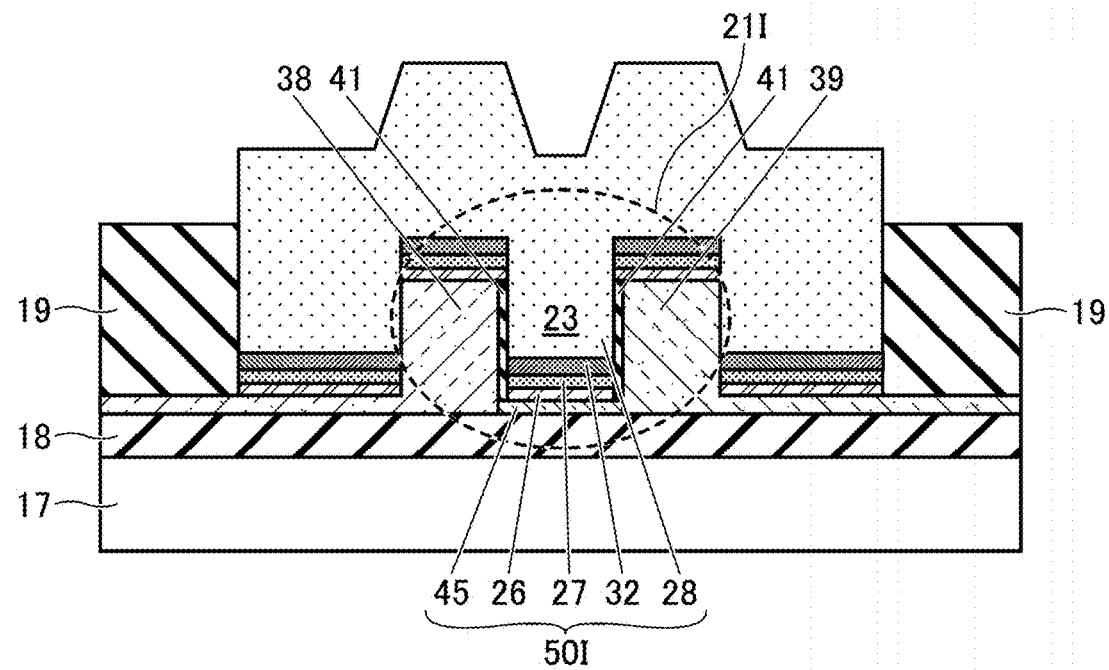
FIG. 30 is a schematic diagram of a slot waveguide having a multilayer film of the ninth embodiment.

FIG. 30 is a cross-sectional view of a slot waveguide 21I using a multilayer film 50I according to the ninth embodiment. In the ninth embodiment, a $SiO_2$ layer 18 is formed on the Si substrate 17. One electrode 38 is formed of a single-crystal Si of a first conductive type (for example, P-type), and the other electrode 39 is formed of a single-crystal Si of a second conductive type (for example, N-type) on the $SiO_2$ layer 18. The electrodes 38 and 39 are provided close to each other to form a slot 23 between them. The bottom surface of the slot 23 between the electrodes 38 and 39 is of a high resistance, and namely is an insulating single-crystal Si layer 45.

The high resistance single-crystal Si layer 45 is formed by masking the area of the slot 23 so as not to be doped with impurities when ion-implantation of conductive impurities is performed on the electrodes 38 and 39. By providing the insulating single-crystal Si layer 45 between the P-type single-crystal Si electrode 38 and the N-type single-crystal Si electrode 39, a predetermined voltage required to operate the optical device can be applied between the electrodes 38 and 39 without causing electrical short circuit between the electrodes 38 and 39.

The multilayer film 50I includes the high resistance single-crystal Si layer 45, a first layer 26 containing Zr, a second layer 27 containing $ZrO_2$, a layer 32 containing STO, and a third layer 28 containing PZT, provided in this order over the substrate 17. The first layer 26, the second layer 27, the layer 32 containing STO, and the third layer 28 are epitaxially grown on the high resistance single-crystal Si layer 45. In place of this multilayer epitaxial configuration based upon the third embodiment, the epitaxial growth configuration of the first, the second, the fourth, the fifth, or the sixth embodiment may be employed.

Figure 31:
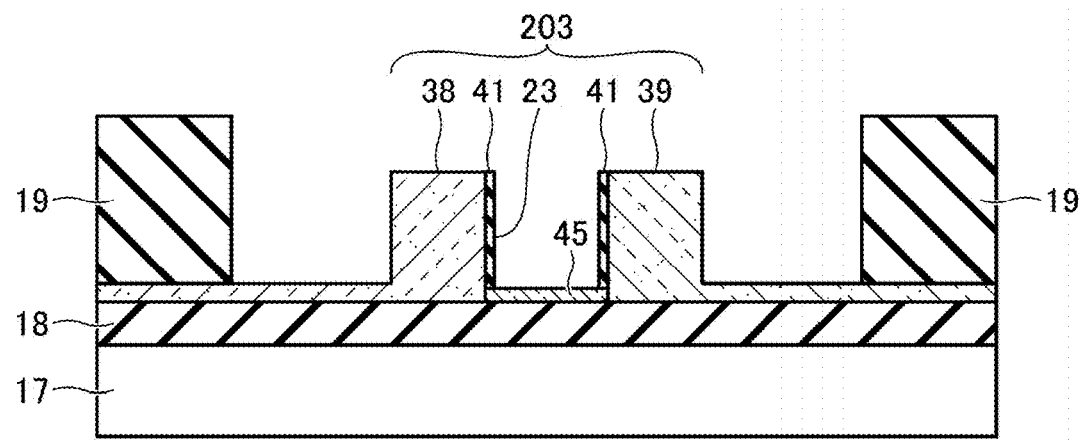
FIG. 31 is a diagram for explaining fabrication of a slot electrode.

FIG. 31 illustrates fabrication of a slot electrode 203 of the ninth embodiment. On the $SiO_2$ layer 18, the P-type electrode 38, the N-type electrode 39, and the high resistance single-crystal Si layer 45 located at the bottom surface of the slot 23 between the electrodes are formed. Next, an insulating layer 19 is formed and flattened over the entire surface of the wafer. Then, an area in which the multilayer film 50I is to be formed is etched so as to expose the electrode 38, the electrode 39, and the high resistance single-crystal Si layer 45. As a result of this etching process, a thin insulating layer 41 with a thickness of 2 to 5 nm remains on the inner side walls of the electrodes 38 and 39. Thus, the slot electrode 203 is formed, in which the side walls facing each other across the slot 23 are covered with a thin insulating layer 41.

The thickness of the high resistance single-crystal Si layer 45 provided between the electrodes 38 and 39 is ⅓ or less, more preferably ⅕ or less of the height of the electrodes 38 and 39, from the viewpoint of improving the voltage applying efficiency, namely, reducing the applied voltage.

After the fabrication of the slot electrode 203, the first layer 26 containing Zr, the second layer 27 containing $ZrO_2$, the layer 32 containing STO, and the third layer 28 containing PZT are epitaxially grown in this order on the high resistance single-crystal Si layer 45 and on the electrodes 38 and 39. Thus, the multilayer film 50I including the high resistance single-crystal Si layer 45 is fabricated.

Figure 32:
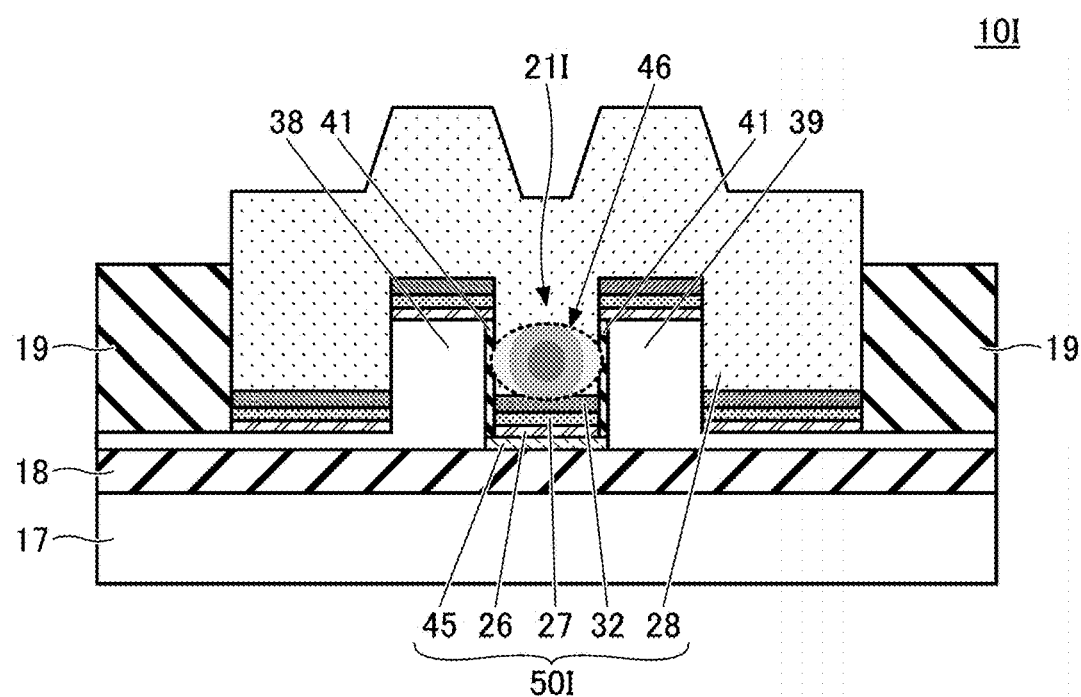
FIG. 32 illustrates a light propagation state of an optical device using the slot waveguide of FIG. 30.

FIG. 32 illustrates a propagation mode of light 46 travelling through the slot waveguide 21I of the optical device 10I. Most of the light 46 is confined in the horizontal direction toward the center of the third layer 28 of the PZT inside the slot between the electrodes 38 and 39. As illustrated in FIG. 13, the refractive indexes of STO and PZT are 2.28 and 2.44, respectively, while the refractive index of $ZrO_2$ is much lower, i.e., 1.54. Accordingly, most of the light 46 is confined in the STO and PZT by the first and second layers in the direction perpendicular to the substrate. This multilayer film contributes to the reduction of propagation loss due to light absorption.

As has already been described above, the length of the slot waveguide 21I can be reduced to about ¼ of the waveguide length of a typical LN optical modulator owing to the electrooptic effect of PZT. When PLZT is used as the third layer, the waveguide length can be further reduced. The multilayer film 50I and the optical device 10I using the multilayer film 50I of the ninth embodiment can be easily integrated in a Si photonic circuit. The requirements for long-term reliability are also satisfied.

Tenth Embodiment

Figure 33:
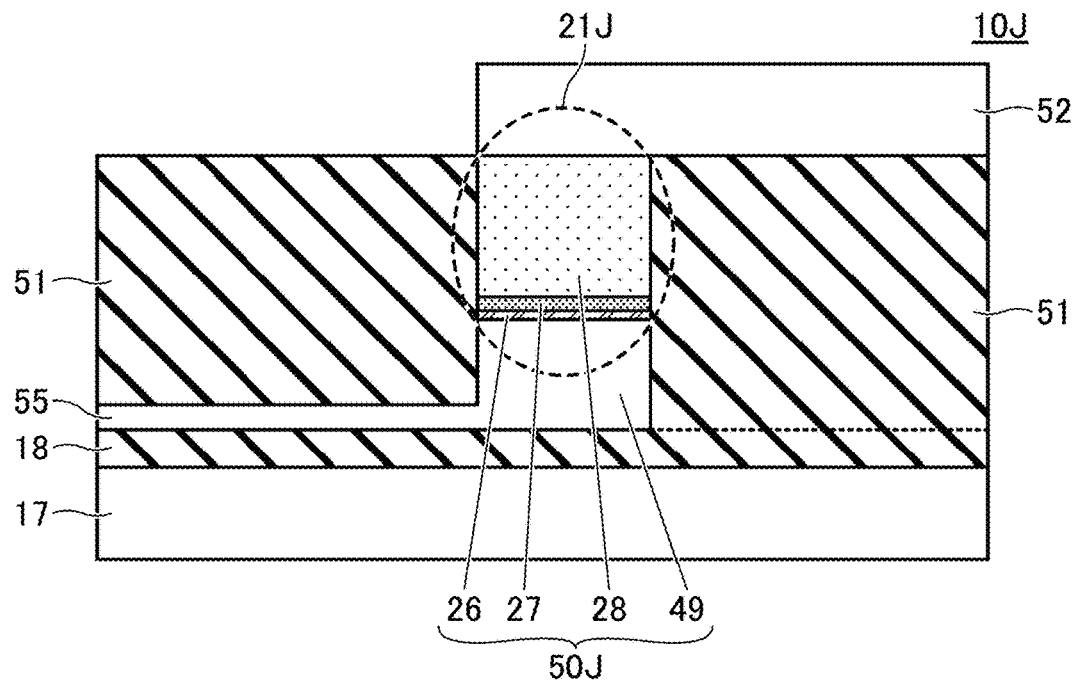
FIG. 33 is a schematic diagram of a slot waveguide having a multilayer film of the tenth embodiment.

FIG. 33 is a schematic cross-sectional view of the slot waveguide 21J using the multilayer film 50J of the tenth embodiment. In the first to ninth embodiments, an optical waveguide was formed of a perovskite-type oxide filling a slot between two electrodes horizontally provided close to each other over the substrate 17. The slot waveguides of the first to ninth embodiments may be referred to as horizontal slot waveguides.

In the tenth embodiment, an optical waveguide is formed by a multilayer film 50J containing a perovskite-type oxide between two electrodes provided close to each other in the direction perpendicular to the substrate. This configuration may be referred to as a vertical slot waveguide.

A single-crystal Si layer 49 which serves as one electrode, and a single-crystal Si interconnect 55 extending from the single-crystal Si layer 49 are provided on the $SiO_2$ layer 18 on the substrate 17. Impurity elements are added in advance to the single-crystal Si layer 49 and the interconnect 55.

Another electrode 52 is provided at an upper layer of the single-crystal Si layer 49. The electrode 52 and the single-crystal Si layer 49 serving as the electrode are positioned close to each other in the film stacking direction. A multilayer film 50J, which includes the first layer 26 containing Zr, the second layer 27 containing $ZrO_2$, and the third layer 28 containing PZT epitaxially grown in this order, is provided between the single-crystal Si layer 49 and the electrode 52. The multiplayer film 50J sandwiched between the single-crystal Si layer 49 and the electrode 52 configures a slot waveguide 21J. The upper electrode 52 is formed by, for example, epitaxially growing a Si layer and patterning it into a predetermined electrode shape. The Si layer configuring the electrode 52 may be amorphous, polycrystalline, or monocrystalline.

As described above with reference to FIG. 13, the $ZrO_2$ crystal is cubic, and has a lattice constant of 0.514 nm, which is close to the lattice constant of 0.543 nm of Si which is also a cubic crystal. Accordingly, the second layer 27 containing $ZrO_2$ can be epitaxially grown on the Si single crystal layer 49. In order to satisfactorily grow the first layer 26 containing Zr and the second layer 27 containing $ZrO_2$ on the low resistance single-crystal Si layer 49, it may be preferable that no silicon oxide film exists on the surface of the single-crystal Si layer 49. However, epitaxial growth can actually be performed even if a very thin natural oxide film exists.

As described above, the third layer 28 containing PZT can epitaxially grow on the second layer 27 containing $ZrO_2$ by the self-aligned in-plane rotation of the PZT crystal.

The slot waveguide 20J including the multilayer film 50J is surrounded by the insulating layer 51 in the lateral or horizontal direction. The insulating layer 51 is formed of a transparent material having a refractive index lower than that of PZT, such as $SiO_2$ or $Al_2O_3$. The insulating layer 51 serves as a clad layer that confines light in the third layer 28 in the lateral direction parallel to the substrate.

The interconnect 55 and the electrode 52 extend in opposite directions, with the multilayer film 50J interposed therebetween. By connecting the multilayer film 50J to the interconnect 55 and the electrode 52 extending in opposite directions, an electric field can be efficiently applied to the PZT of the third layer.

Figure 34:
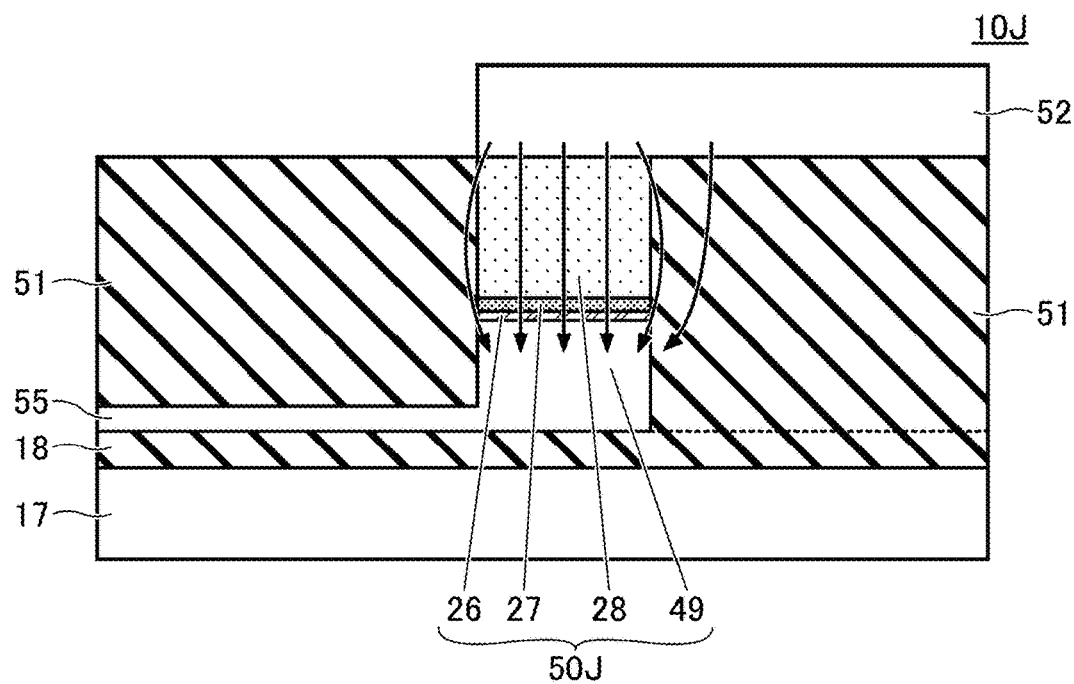
FIG. 34 schematically illustrates the electric lines of force acting on the slot waveguide of FIG. 33.

FIG. 34 is a schematic diagram illustrating electric lines of force acting on the slot waveguide 21J of FIG. 33. If the interconnect 55 and the electrode 52 extend in the same direction, an electric field is applied to the insulating layer 51 existing between the interconnect 55 and the electrode 52 upon application of a voltage, and the electric field cannot be concentrated to the third layer 28 containing PZT. By connecting the interconnect 55 and the electrode 52 to the multilayer film 50J from opposite directions, electric lines of force can be concentrated to the PZT when a voltage is applied.

In order to make the PZT crystals of the third layer 28 exert the maximum electrooptic effect in the voltage applying direction during actual use, a voltage higher than in normal use may be applied in advance at high temperature to regulate the crystal polarization. This also applies to the case where PLZT is used for the third layer.

Figure 35:
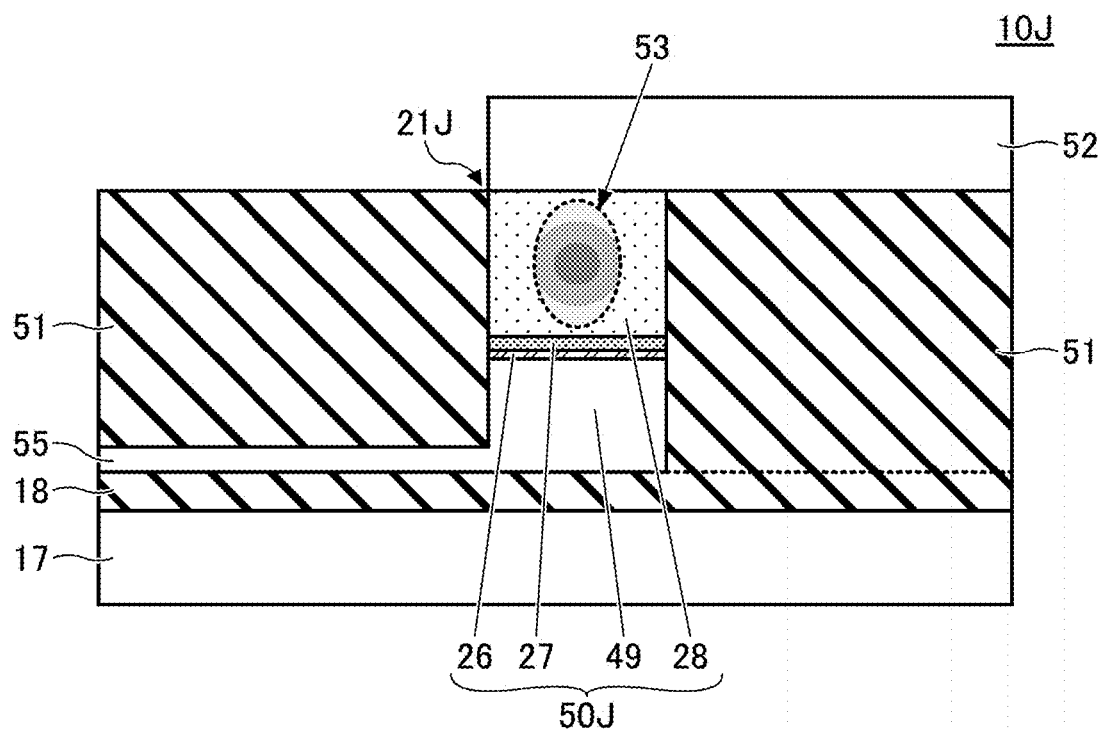
FIG. 35 illustrates a light propagation state of an optical device using the slot waveguide of FIG. 33.

FIG. 35 illustrates a state of light 53 propagating through the slot waveguide 21J of the optical device 10J. Most of the light 53 is confined in the horizontal direction toward the center of the third layer 28 sandwiched between the insulating layers 51. In the direction perpendicular to the substrate, the single-crystal Si layer 49 and the Si electrode 52 whose refractive index is higher than that of the PZT of the third layer 28 are provided close to each other. A slot propagation mode is generated in the PZT sandwiched between the single-crystal Si layer 49 and the Si electrode 52. Both the second layer 27 containing $ZrO_2$ and the third layer 28 containing PZT are dielectrics that are transparent to the fiber optic communication wavelength, and thus there is almost no light propagation loss.

Figure 36A:
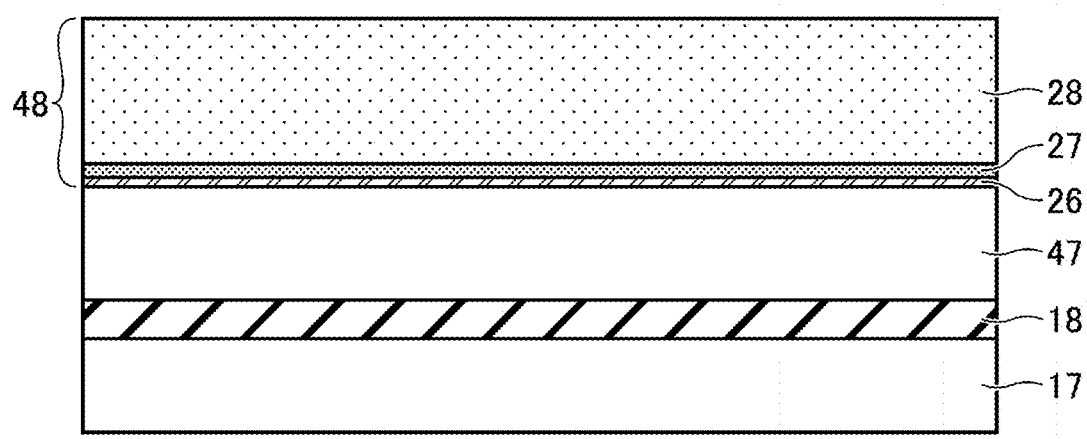
FIG. 36A illustrates a fabrication process of the slot waveguide of FIG. 33.

FIG. 36A to FIG. 36E illustrate an example of a fabrication process of the slot waveguide 21J of the optical device 10J. In FIG. 36A, an SOI substrate in which a $SiO_2$ layer 18 and a single-crystal Si layer 47 are formed on a Si substrate 17 is used. Impurity elements such as boron (B) and phosphorous (P) are ion-implanted in advance in any necessary areas of the single-crystal Si layer 47 to reduce the resistance.

As in the first embodiment, a first layer 26 containing Zr and having a thickness of about 7 nm, a second layer 27 containing $ZrO_2$, and a third layer 28 containing PZT are epitaxially grown in this order on a single-crystal Si layer 47. Thus, a multilayer stack 48 including the first layer 26, the second layer 27 and the third layer 28 is obtained.

Figure 36B:
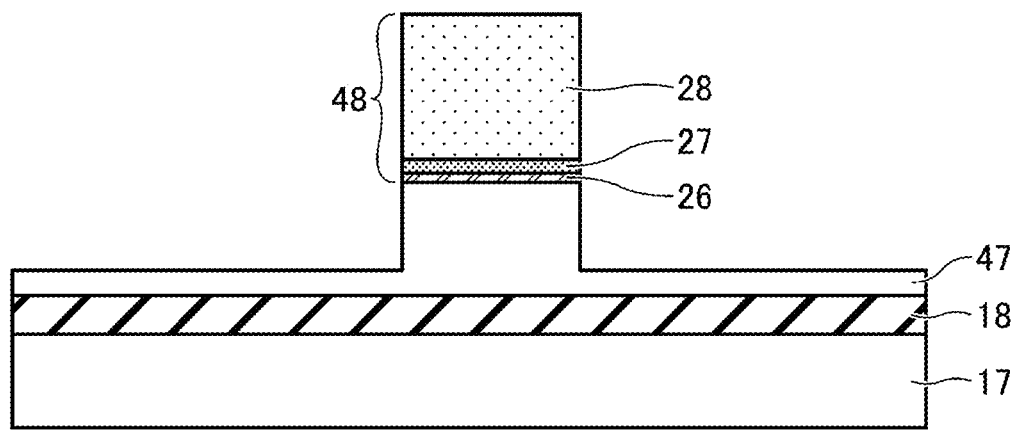
FIG. 36B illustrates the fabrication process of the slot waveguide of FIG. 33.

In FIG. 36B, a part of the multilayer stack 48 and a part of the single-crystal Si layer 47 are removed by etching to form a ridge having the part of the multilayer stack 48.

Figure 36C:
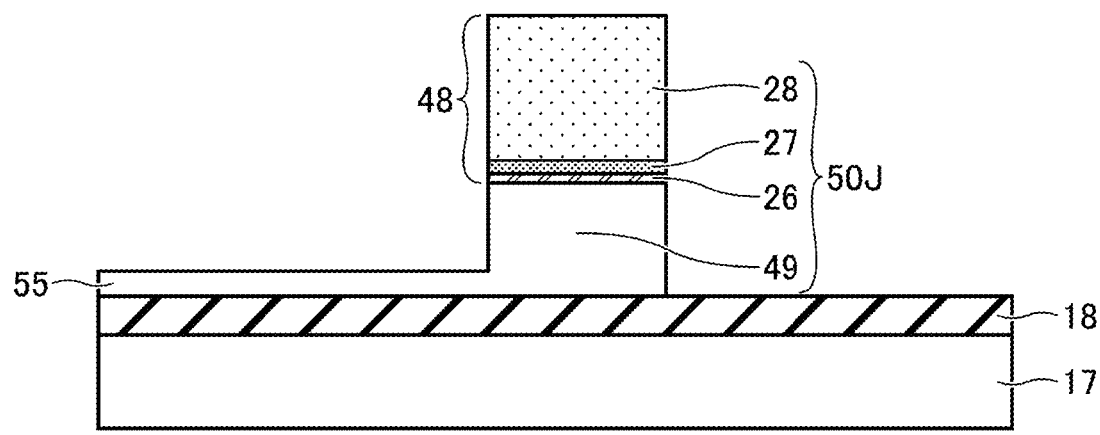
FIG. 36C illustrates a fabrication process of the slot waveguide of FIG. 33.

In FIG. 36C, the single-crystal Si layer 47 extending on one side of the ridge is completely removed by etching, thereby forming the single-crystal Si layer 49 serving as an electrode and the interconnect 55. At this stage, a multilayer film 50J including the single-crystal Si layer 49 is obtained.

Figure 36D:
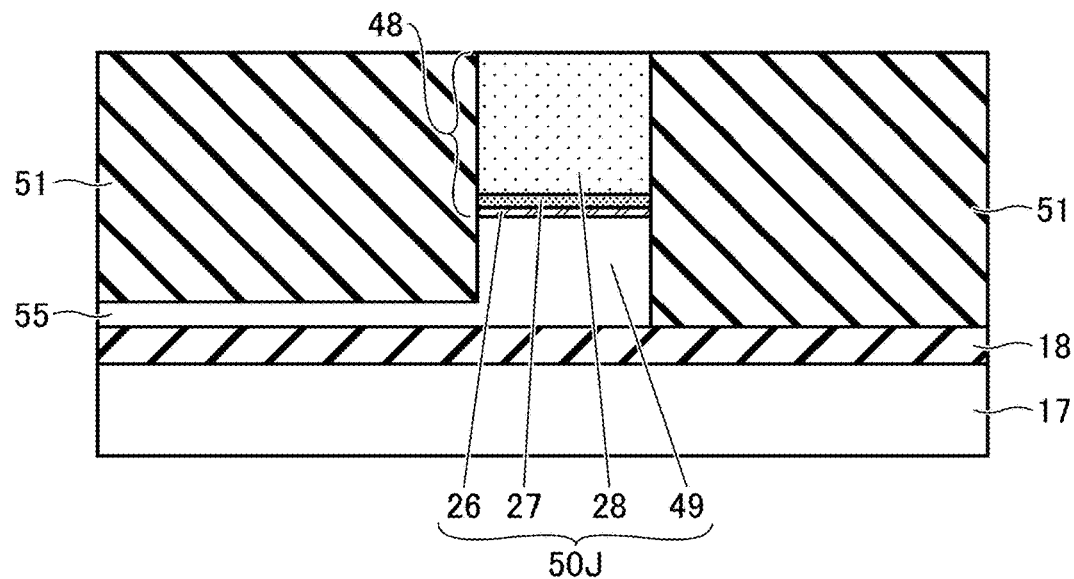
FIG. 36D illustrates a fabrication process of the slot waveguide of FIG. 33.

In FIG. 36D, an insulating layer 51 having a thickness of several microns is formed by CVD or the like around at least the multilayer film 50J. Then, the insulating layer 51 is flattened by CMP or the like until the third layer 28 containing PZT is exposed.

Figure 36E:
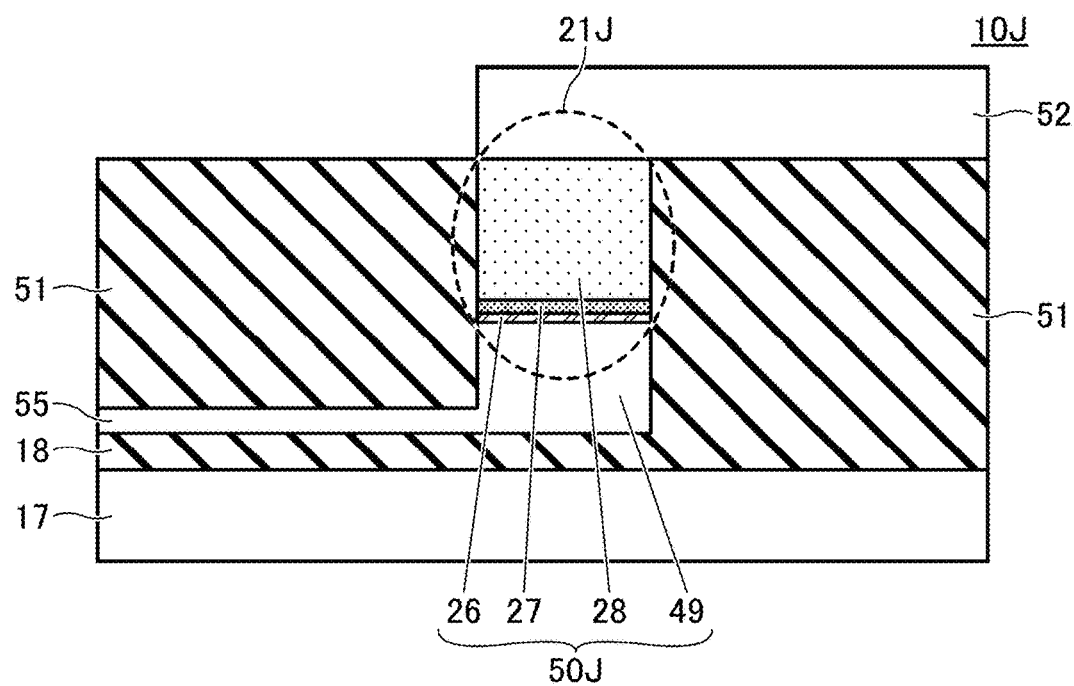
FIG. 36E illustrates a fabrication process of the slot waveguide of FIG. 33.

In FIG. 36E, a Si layer is formed by sputtering on the third layer 28 containing PZT and on the insulating layer 51 positioned near around the third layer 28. The Si layer positioned on the same side as the interconnect 55 is removed by etching to form the electrode 52 extending in the direction opposite to the interconnect 55. An impurity element may be added during sputtering of the Si layer, or the impurity element may be added by ion implantation after the electrode 52 is formed. With this configuration, an electric field can be efficiently applied to the third layer 28 containing PZT.

Figure 37A:
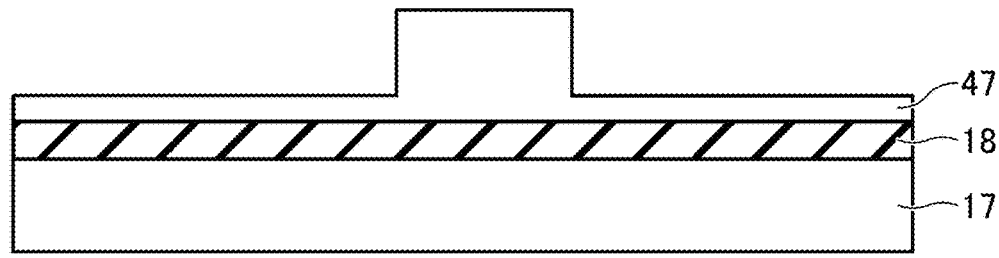
FIG. 37A illustrates another fabrication process of the slot waveguide of FIG. 33.
Figure 37B:
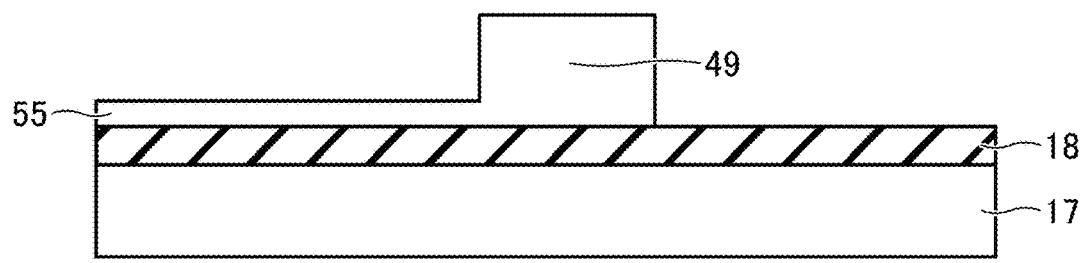
FIG. 37B illustrates the other fabrication process of the slot waveguide of FIG. 33.

FIG. 37A to FIG. 37E illustrate another example of the fabrication process of the slot waveguide 21J of the optical device 10J. In FIG. 37A, a part of the single-crystal Si layer 47 on the $SiO_2$ layer 18 is removed by etching to form a ridge. In FIG. 37B, the single-crystal Si layer 47 positioned on one side of the ridge is completely removed by etching, thereby obtaining the single-crystal Si layer 49 serving as an electrode and the interconnect 55.

Figure 37C:
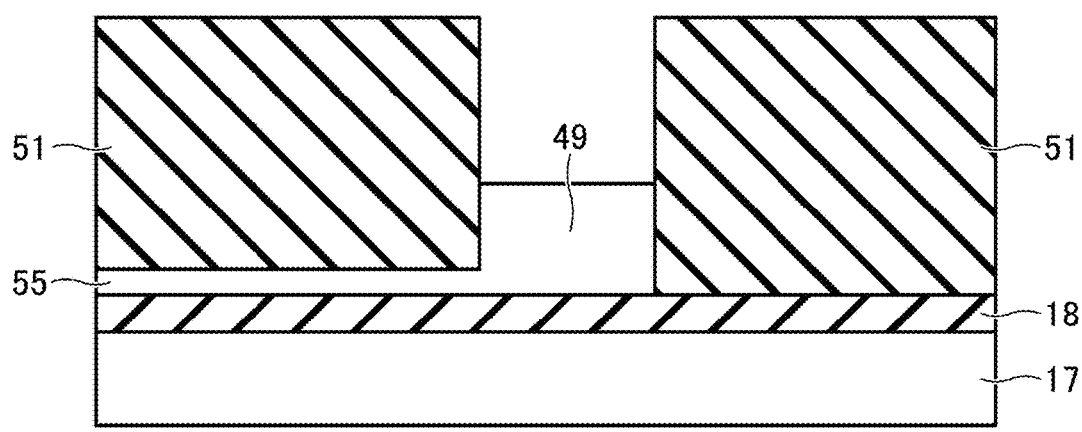
FIG. 37C illustrates the other fabrication process of the slot waveguide of FIG. 33.

In FIG. 37C, an insulating layer 51 having a thickness of several microns is formed at least around the single-crystal Si layer 49 by CVD or the like. The insulating layer 51 is then flattened by CMP or the like. Then, a part of the insulating layer 51 located on the single-crystal Si layer 49 is removed by etching to expose the top surface of the single-crystal Si layer 49.

Figure 37D:
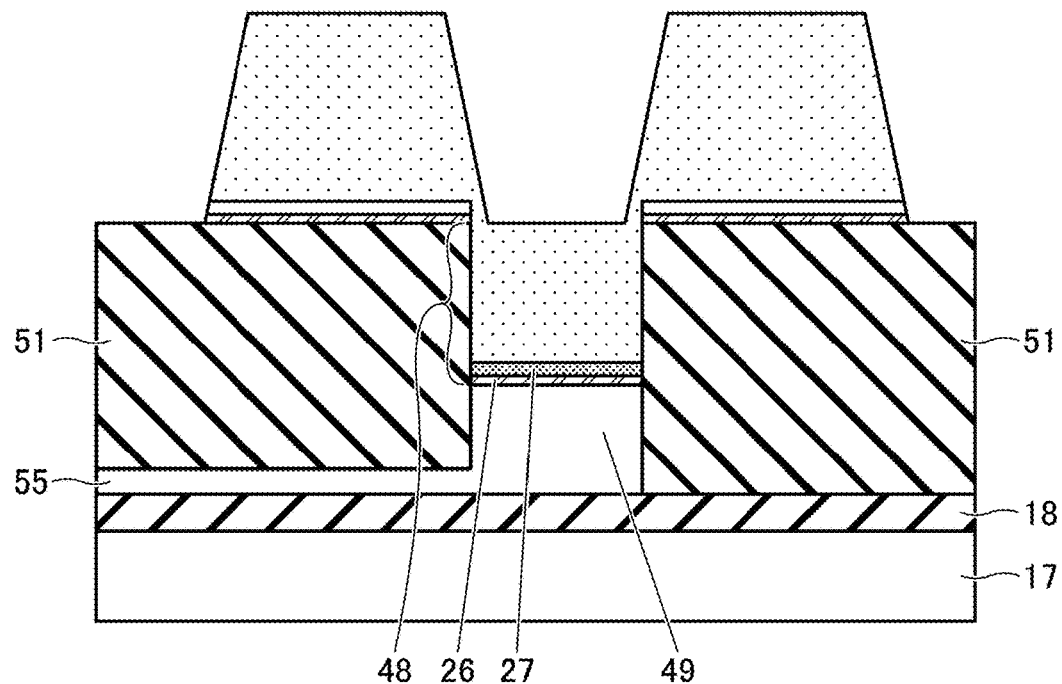
FIG. 37D illustrates the other fabrication process of the slot waveguide of FIG. 33.
Figure 37E:
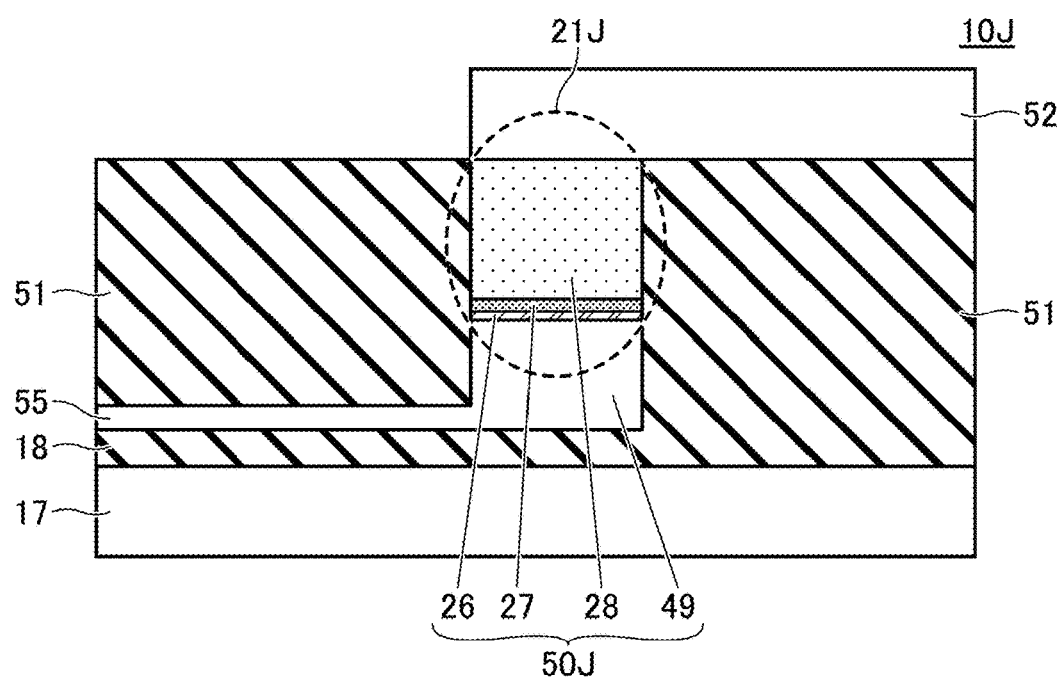
FIG. 37E illustrates the other fabrication process of the slot waveguide of FIG. 33.

In FIG. 37D, the first layer 26, the second layer 27, and the third layer 28 are epitaxially grown in this order at least around the single-crystal Si layer 49, thereby forming a multilayer stack 48. Finally, in FIG. 37E, the structure is flattened by CMP or the like, and an electrode 52 connected to the third layer 28 is formed in a predetermined area on the insulating layer 51. This, an optical device 10J having a slot waveguide 21J is obtained.

The fabrication process of the slot waveguide 21J is not particularly limited, and any suitable process of forming the vertical slot waveguide 21J may be employed.

Although the present disclosure has been described based on specific examples, the disclosure is not limited to the above-described configurations. The multilayer film 50 of the embodiment can be applied to optical devices such as optical switches or optical resonators, in addition to optical modulators. In an application to an optical switch, the output port can be switched between the cross port and the through port for a light beam incident from the input port, by turning on and off the voltage applied to the slot waveguide 21. Because of the large electrooptic effect of a perovskite oxide of the multilayer film, the switching speed is high. By using an inorganic material, long-term reliability of operation is achieved. When the multilayer film 50 is applied to an optical resonator, the resonance frequency of a ring resonator or a racetrack resonator can be regulated by adjusting an applied voltage.

The third layer containing a perovskite oxide is not limited to $(Pb)(Zr, Ti)O_3$ and $(Pb, La)(Zr, Ti)O_3$, and other perovskite oxides having the electrooptic effect, including $K(Ta, Nb)O_3$, $(Sr, Ba)TiO_3$, and $BaTiO_3$, may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A multilayer film comprising:
   a single-crystal silicon layer;
   a first layer containing Zr;
   a second layer containing $ZrO_2$;
   a third layer containing a perovskite oxide having an electrooptic effect, the first layer, the second layer, and the third layer being provided in this order above the single-crystal silicon layer, and
   a layer containing $SrTiO_3$ or MgO provided between the second layer and the third layer,
   wherein the multilayer film is transparent to a wavelength to be used, and
   wherein the perovskite oxide is $(Pb)(Zr, Ti)O_3$ or $(Pb, La)(Zr, Ti)O_3$.

2. The multilayer film as claimed in claim 1, wherein the single-crystal silicon layer is provided on a silicon oxide layer.

3. An optical device comprising:
   a substrate;
   a slot electrode having a slot between a pair of conductors provided over the substrate; and
   a multilayer film provided in the slot;

wherein the multilayer film includes a single-crystal silicon layer, a first layer containing Zr, a second layer containing $ZrO_2$, a third layer containing a perovskite oxide, the first layer, the second layer, and the third layer being epitaxially grown in this order above the single-crystal silicon layer, and a layer containing $SrTiO_3$ or provided between the second layer and the third layer, and wherein a waveguide is formed of the third layer inside the slot, and wherein the perovskite oxide is $(Pb)(Zr, Ti)O_3$ or $(Pb, La)(Zr, Ti)O_3$.

4. The optical device as claimed in claim 3, comprising:
an insulating layer located on side walls of the pair of conductors, the side walls facing each other across the slot.

5. The optical device as claimed in claim 3,
wherein the single-crystal silicon layer is a single-crystal undoped silicon provided to a bottom surface of the slot.

6. The optical device as claimed in claim 3,
wherein one of the pair of conductors is formed of a first conductive type single-crystal silicon, and the other of the pair of conductors is formed of a second conductive type single-crystal silicon,
wherein the single-crystal silicon layer is either one of the first conductive type single-crystal silicon, the second conductive type single-crystal silicon, or a single-crystal silicon having a PN junction, and
wherein potentials applied to the pair of conductors are reverse to the conductive types of the corresponding conductors.

7. The optical device as claimed in claim 3,
wherein the pair of conductors are provided close to each other in a direction perpendicular to the substrate,
wherein the multilayer film is provided between the pair of conductors in the direction perpendicular to the substrate, and between an insulating layer with a refractive index smaller than the perovskite oxide in a horizontal direction parallel to the substrate, and
wherein an optical waveguide is formed of the perovskite oxide surrounded by the pair of conductors and the insulating layer.

8. The optical device as claimed in claim 7, wherein the pair of conductors extend in opposite directions from the multilayer film provided between the pair of conductors.

9. A photonic integrated circuit device comprising:
an optical device having a substrate, a slot electrode having a slot between a pair of conductors provided over the substrate, and a multilayer film provided in the slot;
a silicon waveguide optically connected to the optical device,
wherein the multilayer film includes a single-crystal silicon layer, a first layer containing Zr, a second layer containing $ZrO_2$, a third layer containing a perovskite oxide, the first layer, the second layer, and the third layer being epitaxially grown in this order above the single-crystal silicon layer, and a layer containing $SrTiO_3$ or MgO provided between the second layer and the third layer, and
wherein a waveguide is formed of the third layer inside the slot t, and wherein the perovskite oxide is $(Pb)(Zr, Ti)O_3$ or $(Pb, La)(Zr, Ti)O_3$.

10. An optical transceiver comprising:
a photonic integrated circuit;
an electric circuit device configured to supply or receive an electric signal to or from the photonic integrated circuit; and
a digital signal processor connected to the electric circuit device,
wherein the photonic integrated circuit includes an optical device, and a silicon waveguide optically connected to the optical device, the optical device having a substrate, a slot electrode having a slot between a pair of conductors provided over the substrate, and a multilayer film provided in the slot,
wherein the multilayer film includes a single-crystal silicon layer, a first layer containing Zr, a second layer containing $ZrO_2$, a third layer containing a perovskite oxide, the first layer, the second layer, and the third layer being epitaxially grown in this order above the single-crystal silicon layer, and a layer containing $SrTiO_3$ or MgO provided between the second layer and the third layer, and
wherein a waveguide is formed of the third layer inside the slot, and wherein the perovskite oxide is $(Pb)(Zr, Ti)O_3$ or $(Pb, La)(Zr, Ti)O_3$.

* * * * *